(12) United States Patent
Demont

(10) Patent No.: US 12,409,756 B2
(45) Date of Patent: Sep. 9, 2025

(54) AIRCRAFT MONITORING SYSTEM AND METHOD FOR ELECTRIC OR HYBRID AIRCRAFTS

(71) Applicant: H55 SA, Sion (CH)

(72) Inventor: Sébastien Demont, Les Agettes (CH)

(73) Assignee: H55 SA, Sion (CH)

( * ) Notice: Subject to any disclaimer, the term of this patent is extended or adjusted under 35 U.S.C. 154(b) by 24 days.

(21) Appl. No.: 18/219,929

(22) Filed: Jul. 10, 2023

(65) Prior Publication Data

US 2024/0025297 A1    Jan. 25, 2024

Related U.S. Application Data

(63) Continuation of application No. 17/377,995, filed on Jul. 16, 2021, now Pat. No. 11,697,358, which is a
(Continued)

(30) Foreign Application Priority Data

Apr. 5, 2017    (CH) .............................. 20170000455
Jan. 25, 2018   (CH) .............................. 20180000086
(Continued)

(51) Int. Cl.
*B60L 58/18*    (2019.01)
*B60L 3/00*     (2019.01)
(Continued)

(52) U.S. Cl.
CPC ............. *B60L 58/18* (2019.02); *B60L 3/0061* (2013.01); *B60L 50/40* (2019.02); *B60L 53/00* (2019.02);
(Continued)

(58) Field of Classification Search
USPC .................................................. 307/9.1–10.1
See application file for complete search history.

(56) References Cited

U.S. PATENT DOCUMENTS 4,434,389 A    2/1984   Langley et al.
4,550,267 A    10/1985  Vaidya
(Continued)

FOREIGN PATENT DOCUMENTS

CN    102255113       11/2011
CN    105711434 A     6/2016
(Continued)

OTHER PUBLICATIONS

Farrell et al., "Designing a Battery Exchange Building for Automated Guided Vehicles", Ports 2016, American Society of Civil Engineers, 2016, pp. 71-80.
(Continued)

*Primary Examiner* — Jared Fureman
*Assistant Examiner* — Aqeel H Bukhari
(74) *Attorney, Agent, or Firm* — Knobbe, Martens, Olson & Bear, LLP

(57) ABSTRACT

This disclosure describes at least embodiments of an aircraft monitoring system for an electric or hybrid airplane. The aircraft monitoring system can be constructed to enable the electric or hybrid aircraft to pass certification requirements relating to a safety risk analysis. The aircraft monitoring system can have different subsystems for monitoring and alerting of failures of a component, such as a battery pack, a motor controller, and/or a motors. The failures that pose a greater safety risk may be monitored and indicated by one or more subsystems without use of programmable components.

24 Claims, 22 Drawing Sheets

Related U.S. Application Data continuation of application No. 17/176,999, filed on Feb. 16, 2021, now Pat. No. 11,065,979, which is a continuation-in-part of application No. 16/802,954, filed on Feb. 27, 2020, now Pat. No. 11,059,386, which is a continuation of application No. 16/506,849, filed on Jul. 9, 2019, now Pat. No. 10,576,843, which is a continuation of application No. 16/211,074, filed on Dec. 5, 2018, now Pat. No. 10,479,223, said application No. 17/176,999 is a continuation-in-part of application No. PCT/IB2019/055110, filed on Jun. 18, 2019, which is a continuation-in-part of application No. 16/211,079, filed on Dec. 5, 2018, now Pat. No. 10,322,824, and a continuation-in-part of application No. PCT/IB2018/060696, filed on Dec. 28, 2018, and a continuation-in-part of application No. PCT/IB2019/053644, filed on May 3, 2019, said application No. 17/176,999 is a continuation-in-part of application No. 16/169,929, filed on Oct. 24, 2018, now abandoned, which is a continuation of application No. 15/943,579, filed on Apr. 2, 2018, now Pat. No. 10,131,246, said application No. 17/176,999 is a continuation-in-part of application No. 17/063,945, filed on Oct. 6, 2020, now Pat. No. 11,148,819, which is a continuation-in-part of application No. 16/842,595, filed on Apr. 7, 2020, now Pat. No. 10,854,866, said application No. 17/063,945 is a continuation-in-part of application No. 16/796,711, filed on Feb. 20, 2020, now abandoned, which is a continuation-in-part of application No. PCT/IB2020/050520, filed on Jan. 23, 2020, said application No. 17/176,999 is a continuation-in-part of application No. 17/064,012, filed on Oct. 6, 2020, now Pat. No. 11,063,323, which is a continuation-in-part of application No. 16/842,595, filed on Apr. 7, 2020, now Pat. No. 10,854,866, and a continuation-in-part of application No. 16/796,711, filed on Feb. 20, 2020, now abandoned.

(60) Provisional application No. 62/724,503, filed on Aug. 29, 2018, provisional application No. 62/758,299, filed on Nov. 9, 2018, provisional application No. 62/830,691, filed on Apr. 8, 2019.

(30) Foreign Application Priority Data

| Jan. 25, 2018 | (CH) | ................................. 20180000087 |
| May 4, 2018 | (CH) | ................................. 20180000564 |
| Jan. 23, 2019 | (CH) | ................................. 20190000073 |

(51) Int. Cl.
  *B60L 50/40* (2019.01)
  *B60L 53/00* (2019.01)
  *B64D 27/24* (2024.01)
  *B64D 45/00* (2006.01)
  *B64F 5/60* (2017.01)
  *H02J 7/14* (2006.01)
  *H02P 5/00* (2016.01)
  *H02J 7/34* (2006.01)

(52) U.S. Cl.
  CPC ............ *B64D 27/24* (2013.01); *B64D 45/00* (2013.01); *B64F 5/60* (2017.01); *H02J 7/1423* (2013.01); *H02P 5/00* (2013.01); *B60L 2200/10* (2013.01); *B60L 2240/36* (2013.01); *B64D 2045/0085* (2013.01); *B64D 2221/00* (2013.01); *H02J 7/143* (2020.01); *H02J 7/345* (2013.01)

(56) References Cited

U.S. PATENT DOCUMENTS

| 4,730,150 | A | 3/1988 | Lee et al. |
| 4,965,879 | A | 10/1990 | Fischer, Jr. |
| 5,030,898 | A | 7/1991 | Hokanson et al. |
| 5,225,764 | A | 7/1993 | Falater |
| 5,414,339 | A | 5/1995 | Masaki et al. |
| 5,850,113 | A | 12/1998 | Weimer et al. |
| 6,078,165 | A | 6/2000 | Ashtiani et al. |
| 6,108,347 | A | 8/2000 | Holmquist |
| 6,153,942 | A | 11/2000 | Roseman et al. |
| 6,178,736 | B1 | 1/2001 | Massey |
| 6,366,311 | B1 | 4/2002 | Monroe |
| 6,439,504 | B1 | 8/2002 | Ahrendt |
| 6,791,226 | B1 | 9/2004 | Dhawan |
| 7,207,521 | B2 | 4/2007 | Atkey et al. |
| 7,482,767 | B2 | 1/2009 | Tether |
| 7,598,703 | B2 | 10/2009 | Zhang et al. |
| 7,706,398 | B2 | 4/2010 | Jung et al. |
| 8,120,310 | B2 | 2/2012 | Littrell et al. |
| 8,281,051 | B2 | 10/2012 | Hartwich |
| 8,341,449 | B2 | 12/2012 | Daniel et al. |
| 8,399,112 | B2 | 3/2013 | Yasui et al. |
| 8,738,217 | B2 | 5/2014 | Banker |
| 8,974,930 | B2 | 3/2015 | Oguri et al. |
| 9,436,261 | B2 | 9/2016 | Yun |
| 9,457,666 | B2 | 10/2016 | Caldeira et al. |
| 9,564,762 | B2 | 2/2017 | Lee et al. |
| 9,643,729 | B2 | 5/2017 | Walter-Robinson |
| 9,659,415 | B2 | 5/2017 | Lee |
| 9,776,731 | B1 | 10/2017 | Liberman et al. |
| 9,806,308 | B2 | 10/2017 | Watanabe et al. |
| 9,806,310 | B1 | 10/2017 | Pounds |
| 9,893,335 | B2 | 2/2018 | Liu |
| 10,131,246 | B2 | 11/2018 | Demont |
| 10,177,698 | B1 | 1/2019 | Gao et al. |
| 10,186,694 | B2 | 1/2019 | Ueda et al. |
| 10,186,697 | B1 | 1/2019 | Harris, III |
| 10,204,244 | B2 | 2/2019 | Butler |
| 10,305,078 | B1 | 5/2019 | Harris, III |
| 10,322,824 | B1 | 6/2019 | Demont et al. |
| 10,326,158 | B2 | 6/2019 | Lee |
| 10,479,223 | B2 | 11/2019 | Demont |
| 10,576,843 | B2 | 3/2020 | Demont et al. |
| 10,608,304 | B2 | 3/2020 | Ruehle |
| 10,854,866 | B2 | 12/2020 | Demont |
| 11,059,386 | B2 | 7/2021 | Demont et al. |
| 11,063,323 | B2 | 7/2021 | Demont |
| 11,065,979 | B1 | 7/2021 | Demont |
| 11,128,251 | B1 | 9/2021 | Solodovnik et al. |
| 11,148,819 | B2 | 10/2021 | Demont |
| 2003/0143460 | A1 | 7/2003 | Yoshida |
| 2003/0182040 | A1 | 9/2003 | Davidson |
| 2003/0232236 | A1 | 12/2003 | Mitchell et al. |
| 2004/0119427 | A1 | 6/2004 | Stridsberg |
| 2004/0236480 | A1 | 11/2004 | Granger et al. |
| 2005/0162172 | A1 | 7/2005 | Bertness |
| 2006/0109009 | A1 | 5/2006 | Banke |
| 2007/0044737 | A1 | 3/2007 | Lindsey |
| 2007/0052806 | A1 | 3/2007 | Bnayahu et al. |
| 2007/0164166 | A1 | 7/2007 | Hirvonen |
| 2007/0164168 | A1 | 7/2007 | Hirvonen et al. |
| 2007/0202792 | A1 | 8/2007 | Shimizu et al. |
| 2008/0006739 | A1 | 1/2008 | Mochida et al. |
| 2008/0103632 | A1 | 5/2008 | Saban et al. |
| 2008/0211309 | A1 | 9/2008 | Nolte |
| 2008/0272669 | A1 | 11/2008 | Mohle et al. |
| 2009/0111007 | A1 | 4/2009 | Naganuma |
| 2009/0111015 | A1 | 4/2009 | Wood et al. |
| 2009/0139781 | A1 | 6/2009 | Straubel |
| 2009/0142653 | A1 | 6/2009 | Okada et al. |
| 2009/0155680 | A1 | 6/2009 | Maguire et al. |
| 2009/0206661 | A1 | 8/2009 | Baumann et al. |
| 2009/0212626 | A1 | 8/2009 | Snyder |
| 2009/0233162 | A1 | 9/2009 | Fang et al. |
| 2009/0302153 | A1 | 12/2009 | Matasso |
| 2010/0007293 | A1 | 1/2010 | Meadors et al. |

(56) References Cited

U.S. PATENT DOCUMENTS

| | | |
|---|---|---|
| 2010/0075213 A1 | 3/2010 | Mehta et al. |
| 2010/0101242 A1 | 4/2010 | Froelich |
| 2010/0102934 A1 | 4/2010 | Guichard |
| 2010/0121587 A1 | 5/2010 | Vian |
| 2010/0136396 A1 | 6/2010 | Hermann et al. |
| 2010/0190049 A1 | 7/2010 | Kawase et al. |
| 2010/0248008 A1 | 9/2010 | Sugawara et al. |
| 2010/0255359 A1 | 10/2010 | Hirakawa et al. |
| 2011/0054721 A1 | 3/2011 | Goodrich |
| 2011/0063137 A1 | 3/2011 | Pimouguet et al. |
| 2011/0200854 A1 | 8/2011 | Bak et al. |
| 2011/0254502 A1 | 10/2011 | Yount et al. |
| 2011/0293986 A1 | 12/2011 | Kozu |
| 2012/0025032 A1 | 2/2012 | Hopdjanian |
| 2012/0070710 A1 | 3/2012 | Kritzer et al. |
| 2012/0121949 A1 | 5/2012 | Eberhard et al. |
| 2012/0146581 A1 | 6/2012 | Tu |
| 2012/0161676 A1 | 6/2012 | White |
| 2012/0166031 A1 | 6/2012 | Nishida |
| 2012/0177970 A1 | 7/2012 | Marchio et al. |
| 2012/0203482 A1 | 8/2012 | Parle et al. |
| 2012/0242144 A1 | 9/2012 | Chorian et al. |
| 2012/0244404 A1 | 9/2012 | Obasih et al. |
| 2012/0268069 A1 | 10/2012 | Park |
| 2013/0024053 A1 | 1/2013 | Caule et al. |
| 2013/0040178 A1 | 2/2013 | Lim |
| 2013/0076190 A1 | 3/2013 | Jarvinen et al. |
| 2013/0090813 A1 | 4/2013 | Kanekawa |
| 2013/0216871 A1 | 8/2013 | Lee |
| 2013/0305391 A1 | 11/2013 | Haukom |
| 2014/0035357 A1 | 2/2014 | Hausmann et al. |
| 2014/0084817 A1 | 3/2014 | Bhavaraju |
| 2014/0197681 A1 | 7/2014 | Iwashima |
| 2014/0212695 A1 | 7/2014 | Lane |
| 2014/0283360 A1 | 9/2014 | Takeda et al. |
| 2014/0303812 A1 | 10/2014 | Avritch et al. |
| 2014/0339371 A1 | 11/2014 | Yates et al. |
| 2014/0342201 A1 | 11/2014 | Andres |
| 2015/0019771 A1 | 1/2015 | Greef |
| 2015/0115108 A1 | 4/2015 | Benson et al. |
| 2015/0123622 A1 | 5/2015 | Yasui |
| 2015/0130471 A1 | 5/2015 | Bolduc |
| 2015/0221914 A1 | 8/2015 | Page et al. |
| 2015/0232191 A1 | 8/2015 | Wetzel |
| 2015/0263546 A1 | 9/2015 | Senoo |
| 2015/0285165 A1 | 10/2015 | Steinwandel |
| 2015/0339371 A1 | 11/2015 | Cao et al. |
| 2015/0344156 A1 | 12/2015 | Vail, III |
| 2015/0353192 A1 | 12/2015 | Morrison |
| 2015/0358002 A1 | 12/2015 | Startin |
| 2015/0382496 A1 | 12/2015 | Burant, Jr. |
| 2016/0036308 A1 | 2/2016 | Bailey et al. |
| 2016/0047861 A1 | 2/2016 | Cher |
| 2016/0107758 A1 | 4/2016 | Esteyne et al. |
| 2016/0149169 A1 | 5/2016 | Okura |
| 2016/0167800 A1 | 6/2016 | Joubert et al. |
| 2016/0197386 A1 | 7/2016 | Moon et al. |
| 2016/0218579 A1 | 7/2016 | Peng et al. |
| 2016/0236790 A1 | 8/2016 | Knapp |
| 2016/0254576 A1 | 9/2016 | Burns |
| 2016/0304214 A1 | 10/2016 | Himmelmann |
| 2016/0347180 A1 | 12/2016 | Steffani |
| 2016/0359329 A1 | 12/2016 | Kim et al. |
| 2017/0001511 A1 | 1/2017 | Kulkarni |
| 2017/0008418 A1 | 1/2017 | Ciampolini et al. |
| 2017/0054314 A1 | 2/2017 | Tang |
| 2017/0057650 A1 | 3/2017 | Walter-Robinson |
| 2017/0066531 A1 | 3/2017 | McAdoo |
| 2017/0109980 A1 | 4/2017 | Engels et al. |
| 2017/0126025 A1 | 5/2017 | Bando et al. |
| 2017/0210229 A1 | 7/2017 | Brochhaus |
| 2017/0210481 A1 | 7/2017 | Bak |
| 2017/0214070 A1 | 7/2017 | Wang |
| 2017/0243413 A1 | 8/2017 | Haggerty et al. |
| 2017/0247126 A1 | 8/2017 | Blanding et al. |
| 2017/0253344 A1 | 9/2017 | Wangemann et al. |
| 2017/0309093 A1 | 10/2017 | Feng |
| 2017/0331163 A1 | 11/2017 | Ebner |
| 2017/0352931 A1 | 12/2017 | Yoshida et al. |
| 2018/0012484 A1 | 1/2018 | Sakabe |
| 2018/0022451 A1 | 1/2018 | Lim |
| 2018/0024201 A1 | 1/2018 | Izawa |
| 2018/0056794 A1 | 3/2018 | Kim et al. |
| 2018/0079530 A1 | 3/2018 | Wyrobek |
| 2018/0105282 A1 | 4/2018 | Tweet |
| 2018/0108188 A1 | 4/2018 | Canning |
| 2018/0138476 A1 | 5/2018 | Yamazaki et al. |
| 2018/0138478 A1 | 5/2018 | Chan |
| 2018/0170511 A1 | 6/2018 | Mores |
| 2018/0198154 A1 | 7/2018 | Lee |
| 2018/0229618 A1 | 8/2018 | Lee |
| 2018/0237148 A1 | 8/2018 | Hehn et al. |
| 2018/0268719 A1 | 9/2018 | Guan |
| 2018/0269436 A1 | 9/2018 | Lee et al. |
| 2018/0283292 A1 | 10/2018 | Steinwandel |
| 2018/0287234 A1 | 10/2018 | Melack et al. |
| 2018/0290682 A1 | 10/2018 | Nampei et al. |
| 2018/0301765 A1 | 10/2018 | Knape |
| 2018/0321325 A1 | 11/2018 | Fortier |
| 2018/0358593 A1 | 12/2018 | Seo |
| 2018/0358671 A1 | 12/2018 | Halsey et al. |
| 2019/0006650 A1 | 1/2019 | Bryla |
| 2019/0019638 A1 | 1/2019 | Humphreys |
| 2019/0097203 A1 | 3/2019 | Kwag |
| 2019/0097204 A1 | 3/2019 | Liposky |
| 2019/0097282 A1 | 3/2019 | Melack et al. |
| 2019/0135403 A1 | 5/2019 | Perry et al. |
| 2019/0140233 A1 | 5/2019 | Yeh |
| 2019/0212733 A1 | 7/2019 | Lan |
| 2019/0221814 A1 | 7/2019 | Shimizu |
| 2019/0229542 A1 | 7/2019 | Dunn |
| 2019/0252652 A1 | 8/2019 | Guillemard |
| 2019/0263498 A1 | 8/2019 | Bernasconi et al. |
| 2019/0280354 A1 | 9/2019 | Schlak et al. |
| 2019/0283611 A1 | 9/2019 | Conlon |
| 2019/0296300 A1 | 9/2019 | Zimmermann et al. |
| 2019/0319448 A1 | 10/2019 | Pevear |
| 2019/0337409 A1 | 11/2019 | Demont et al. |
| 2020/0035967 A1 | 1/2020 | Yoon |
| 2020/0080793 A1 | 3/2020 | Houle |
| 2020/0140106 A1* | 5/2020 | Dougherty ............. B64D 27/24 |
| 2020/0231047 A1 | 7/2020 | Demont |
| 2020/0277080 A1* | 9/2020 | Wiegman ................. B60L 1/00 |
| 2020/0324908 A1* | 10/2020 | Wortmann ............. B64D 27/24 |
| 2020/0339010 A1 | 10/2020 | Villanueva et al. |
| 2020/0385137 A1 | 12/2020 | Dionne |
| 2021/0075283 A1 | 3/2021 | Turvey |
| 2021/0163142 A1 | 6/2021 | Lacko et al. |
| 2021/0394916 A1* | 12/2021 | Baig ....................... H02J 1/106 |
| 2022/0181732 A1 | 6/2022 | Weis |
| 2022/0181742 A1 | 6/2022 | Mabrey et al. |
| 2022/0209336 A1 | 6/2022 | Deliang |
| 2023/0027399 A1 | 1/2023 | Weigman |

FOREIGN PATENT DOCUMENTS

| | | |
|---|---|---|
| CN | 205377342 U | 7/2016 |
| CN | 106314809 A | 1/2017 |
| CN | 111252256 A | 6/2020 |
| CN | 211017160 U | 7/2020 |
| CN | 214706088 U | 11/2021 |
| CN | 217009350 U | 7/2022 |
| DE | 102007054228 | 5/2009 |
| DE | 102013217458 | 3/2015 |
| DE | 102014200997 | 7/2015 |
| DE | 102016204720 | 9/2017 |
| DE | 10 2016 109 277 | 11/2017 |
| DE | 102017122850 | 4/2019 |
| DE | 102018124793 | 4/2020 |
| EP | 2451059 | 5/2012 |
| EP | 3796413 | 3/2021 |
| FR | 2988522 | 9/2013 |
| JP | 2011-114961 | 6/2011 |
| JP | 2012-160347 | 8/2012 |

(56) References Cited

FOREIGN PATENT DOCUMENTS

| JP | 2012-175823 | 9/2012 |
|----|-------------|--------|
| JP | 2013-84444 | 5/2013 |
| KR | 10-1733159 | 5/2017 |
| KR | 20180009020 | 1/2018 |
| RU | 2011126465 | 1/2013 |
| WO | WO 94/14226 | 6/1994 |
| WO | WO 03/026201 | 3/2003 |
| WO | WO 2004/068694 | 8/2004 |
| WO | WO 2011/100957 | 8/2011 |
| WO | WO 2012/014348 | 2/2012 |
| WO | WO 2012/147150 | 11/2012 |
| WO | WO 2015/168320 | 11/2015 |
| WO | WO 2018/053680 | 3/2018 |
| WO | WO 2018/130488 | 7/2018 |
| WO | WO 2019/006469 | 1/2019 |
| WO | WO 2019/206409 | 10/2019 |
| WO | WO 2019/211810 | 11/2019 |
| WO | WO 2020/044134 | 3/2020 |
| WO | WO 2020/044275 | 3/2020 |
| WO | WO 2022/072642 | 4/2022 |

OTHER PUBLICATIONS

Saw et al., "Computational fluid dynamic and thermal analysis of Lithium-ion battery pack with air cooling", Applied Energy vol. 177, 2016, pp. 783-792.
H55 Products, https://www.h55.ch/products, date accessed Jan. 16, 2020, in 6 pages.
International Search Report and Written Opinion for International Application No. PCT/IB2020/053320, mailed Jul. 6, 2020, in 16 pages.
Are modern aircraft provided with analog consoles in case of a software failure?—Aviation Stack Exchange, http://aviation.stackexchange.com/questions/3905/are-modern-aircraft-provided-with-analog-consoles-in-case-of-a-software-failure, dated 2015, in 2 pages.
Palmer, Ryan C., "Applying Human Factors Principles in Aviation Displays: A Transition From Analog to Digital Cockpit Displays in the CP140 Aurora Aircraft", Master's Thesis, University of Tennessee, dated Aug. 2007, in 121 pages.
Switches: How to switch between two DC power sources powering a motor on an electric vehicle?—Electric Engineering Stack Exchange, https://electronics.stackexchange.com/questions/151341/how-to-switch-between-two-dc-power-sources-powering-a-motor-on-an-electric-vehicle, dated 2015, in 3 pages.
Search Report for Swiss Patent Application No. 20190000073, dated May 28, 2019, in 4 pages.
Clips from Video "Charging an EV with a portable battery—Does it Work?", https://www.youtube.com/watch?v=xL3MICQTPvQ&t=864s, dated Nov. 2017, in 3 pages.
International Search Report and Written Opinion for International Application No. PCT/IB2018/060694, mailed Apr. 5, 2019, in 14 pages.
International Search Report and Written Opinion for International Application No. PCT/IB2020/050520, mailed Apr. 7, 2020, in 14 pages.
International Search Report and Written Opinion for International Application No. PCT/IB2018/060696, mailed Apr. 30, 2019, in 17 pages.
International Search Report and Written Opinion for International Application No. PCT/IB2019/053644, mailed Jul. 15, 2019, in 15 pages.
International Search Report and Written Opinion for International Application No. PCT/IB2018/055110, mailed Aug. 9, 2019, in 14 pages.
World's First Portable EV Power Unit On Sale Now, https://insideevs.com/worlds-first-portable-ev-power-unit-is-on-sale-now, dated Jun. 2012, in 6 pages.
https://www.corrosionpedia.com/definition/6305/epoxy-glass (Year: 2018).

\* cited by examiner

AIRCRAFT MONITORING SYSTEM AND METHOD FOR ELECTRIC OR HYBRID AIRCRAFTS

RELATED APPLICATIONS

Any and all applications for which a foreign or domestic priority claim is identified in the Application Data Sheet of the present application are hereby incorporated by reference under 37 CFR 1.57.

FIELD

The present disclosure concerns an aircraft monitoring system for monitoring at least one component in an electric or hybrid aircraft.

BACKGROUND

Electric and hybrid vehicles have become increasingly significant for the transportation of people and goods. Such vehicles can desirably provide energy efficiency advantages over combustion-powered vehicles and may cause less air pollution than combustion-powered vehicles during operation.

Although the technology for electric and hybrid automobiles has significantly developed in recent years, many of the innovations that enabled a transition from combustion-powered to electric-powered automobiles unfortunately do not directly apply to the development of electric or hybrid aircraft. The functionality of automobiles and the functionality of aircraft are sufficiently different in many aspects so that many of the design elements for electric and hybrid aircraft must be uniquely developed separate from those of electric and hybrid automobiles.

Moreover, any changes to an aircraft's design, such as to enable electric or hybrid operation, also require careful development and testing to ensure safety and reliability. If an aircraft experiences a serious failure during flight, the potential loss and safety risk from the failure may be very high as the failure could cause a crash of the aircraft and pose a safety or property damage risk to passengers or cargo, as well as individuals or property on the ground.

The certification standards for electric or hybrid aircraft are further extremely stringent because of the risks posed by new aircraft designs. Designers of aircraft have struggled to find ways to meet the certification standards and bring new electric or hybrid aircraft designs to market.

In view of these challenges, attempts to make electric and hybrid aircraft commercially viable have been largely unsuccessful. New approaches for making and operating electric and hybrid aircraft thus continue to be desired.

SUMMARY

Flying a manned or unmanned aircraft such an airplane can be dangerous. Problems with the aircraft may result in injury or loss of life for passengers in the aircraft or individuals on the ground, as well as damage to goods being transported by the aircraft or other items around the aircraft.

In order to attempt to mitigate potential problems associated with an aircraft, numerous organizations have developed certification standards for ensuring that aircraft designs and operations satisfy threshold safety requirements. The certification standards may be stringent and onerous when the degree of safety risk is high, and the certification standards may be easier and more flexible when the degree of safety risk is low.

As an example, the FAA advisory circular AC 25.1309-1 describes acceptable means for showing compliance with the airworthiness requirements of US Federal Aviation Regulations defines different levels of failure conditions according to their severity:

Failure Conditions with No Safety Effect.
Minor Failure Conditions.
Major Failure Conditions.
Hazardous Failure Conditions must be no more frequent than Extremely Remote.
Catastrophic Failure Conditions must be Extremely Improbable.

While airplanes must be designed so that hazardous and catastrophic failure conditions are extremely remote or even extremely improbable, those severe failure conditions must nevertheless be monitored, so that warning signals are sent to the pilot and driver who may attempt to remedy to the condition or try to land the aircraft. The monitoring and warning systems must be reliable and also requires certification.

Such certification standards have unfortunately had the effect of slowing commercial adoption and production of electric or hybrid aircraft. Electrical hybrid aircraft may, for example, utilize new aircraft designs relative to traditional aircraft designs to account for differences in operations of electric or hybrid aircraft versus traditional aircraft. The new designs however may be significantly different from the traditional aircraft designs. These differences may subject the new designs to extensive testing prior to certification. The need for extensive testing can take many resources, time and significantly drive up the ultimate cost of the aircraft.

Compliance of a monitoring and warning subsystem with the certification standard depends on the severity of the monitored failure condition. Therefore, a hazardous or catastrophic failure condition requires a strict level of certification of the corresponding monitoring and warning system, while a minor failure condition or a condition without any safety effect have lower safety requirements and requires a monitoring and warning system that is easier to certify, or requires no certification.

There is therefore a need for simplified, yet robust, components and systems for an electric powered aircraft that simplify and streamline certifications requirements and reduce the cost and time required to produce a commercially viable electric aircraft.

According to an aspect, those aims are achieved with an aircraft monitoring system for an electric or hybrid airplane, the aircraft monitoring system having different subsystems for monitoring and alerting of failures of at least one component of the electric or hybrid aircraft, the aircraft monitoring system comprising:

a first subsystem configured to be supported by a housing and consisting of non-programmable components, the housing being configured to fly and be propelled by an electric motor, wherein the non-programmable components are configured to monitor a component supported by the housing, and output a first visual or auditive alert to notify of any catastrophic or hazardous failure condition associated with the component; and a second subsystem configured to be supported by the housing and comprising a processor and a communication bus, wherein the processor is configured to monitor the component, and output a second visual or auditive alert to notify of other failure conditions associated with the component, including major and/or minor failure conditions;

the monitored component including an electric motor.

This has the advantage of providing a first, redundant subsystem for monitoring a component and outputting a first visual or auditive alert in any case of catastrophic or hazardous failure condition. Since the design of this first subsystem is relatively simple and comprises only non-programmable electronic components, it is easier to certify.

The first subsystem is preferably a processorless circuit, and thus does not comprise any processor or other software-controlled component.

The first subsystem preferably might comprise only analog and/or combinational logic electronic components.

The first subsystem may comprise flip-flops.

The first subsystem might be configured to process analog signals and/or binary signals.

The first subsystem preferably generates and processes only analog and/or binary signals but not multivalued digital signals. Multivalued digital signals are digital signals that can indicate more than two different values, for example digital signals comprising a plurality of bits for representing a non-binary value.

The aircraft may be designed so that different subsystems of the aircraft are constructed to have a robustness corresponding to their responsibilities and any related certification standards, as well as potentially any subsystem redundancies. Where a potential failure of the responsibilities of a subsystem would likely be catastrophic (for example, resulting in fatalities on the ground of individuals not in the aircraft, such as when an aircraft suddenly losses altitude), the subsystem can be designed to be very simple and robust and thus may be able to satisfy difficult certification standards. Such a subsystem, for example, can be composed of non-programmable, non-stateful components (for example, analog or non-programmable combinational logic electronic components) rather than a processor. The subsystem, for example, can activate indicators such as lights rather than more sophisticated displays. This first subsystem thus may not be affected by software or programming bugs and may be less impacted by external interference, such as voltage spikes, electromagnetic interference, or radiation, which may cause a malfunction.

On the other hand, where either (i) a second subsystem of an aircraft monitors a parameter redundantly with a first subsystem of the aircraft that is composed of non-programmable, non-stateful components or (ii) a potential failure of the responsibilities of a second subsystem would likely be less than catastrophic (for example, result in major, minor, or no safety effect), the second subsystem can be at least partly digital and designed to be more complicated, feature-rich, and easier to update and yet able to satisfy associated certification standards. The second subsystem can, for instance, include a programmable component or a stateful component like a processor that outputs and presents information on a sophisticated display. This can desirably enable the aircraft to maintain feature-rich systems without sacrificing robust, easily-certifiable safety systems. Although a programmable component or a stateful component may be difficult to safely and reliably update and the programmable component may be more prone to a malfunction due to voltage spikes, electromagnetic interference, or radiation than non-programmable, non-stateful components, the programmable component or the stateful component can more easily provide functionality which may be difficult to provide with non-programmable, non-stateful components.

The aircraft may be provided with a first subsystem responsible for determining, for example, the health of battery components, and for generating warning visual and/or auditory warning signals in case of malfunction. If battery components were to overheat and catch fire, the aircraft would likely suffer a catastrophic failure and rapid loss of altitude. The first subsystem thus can be constructed entirely of non-programmable, non-stateful components. The first subsystem can, for instance, include one or more temperature sensors that detect the temperature proximate one or more batteries in the aircraft and output a signal responsive to detection of a temperature that exceeds a threshold indicative of an unsafe condition. The first subsystem might include hard wires connected to a light or a speaker in the cockpit of the aircraft to indicate the over-temperature condition to a pilot of the aircraft.

A second subsystem may be incorporated with the aircraft to, for example, monitor battery life. This second monitoring subsystem can be responsible for monitoring and displaying an amount of energy remaining for powering an aircraft and can be constructed of a processor that outputs a graphical user interface or speaker. The second subsystem need not be made of non-programmable, non-stateful components at least because the aircraft includes the first battery monitoring subsystem which also monitors the health of the battery components. Thus, the first monitoring subsystem can be made of non-programmable, non-stateful components (such as, analog or non-programmable combinational logic electronic components) to monitor catastrophic failures, while one or more feature-rich processors, sequential logic electronic components, or programmable combinational logic electronic components of another, first monitoring system can provide redundant monitoring of the same conditions and/or additional monitoring of non-catastrophic or non-hazardous conditions.

The first, redundant subsystem in an aircraft can desirably enable certain features of the aircraft to continue to be available even though the second subsystem that is primarily responsible for the certain features may be inoperable. Moreover, a backup component can be secondarily responsible for the certain features without the component that is primarily responsible for those features providing status or control information to the redundant subsystem. This can be beneficial, for example, in the event that the primary component suddenly fails. The backup component can take over without the need for a handoff.

An aircraft in accordance with the disclosure herein can include multiple circuits each capable of performing the responsibilities of one or more other of the multiple circuits. For example, a first circuit of the aircraft may be tasked with primary responsibility for managing a first set of tasks of the aircraft while a second circuit of the aircraft may be tasked with secondary responsibility for the first set of tasks. Similarly, the second circuit may be tasked with primary responsibility for a second set of tasks of the aircraft while the first circuit may be tasked with secondary responsibility for the second set of tasks. If one of the first circuit or the second circuit is inoperative, the other of the first circuit or the second circuit can take over responsibility for the inoperative subsystem. A shared recorder may additionally store data that can be received by the first circuit and the second circuit from one or more aircraft components so that the first circuit and the second circuit may take over primary responsibility for one or more tasks based at least on the data stored to the shared recorder and without communication of status information or operating instructions between the first subsystem and the second subsystem.

A motor of an aircraft can include multiple field coils. Each of the multiple field coils may be used to drive the motor during different phases of rotation for the motor. During use or over the life of the motor, however, one or more of the individual field coils can fail, which may cause a dramatic decrease in average power output by the motor.

An aircraft in accordance with the disclosure here may have features that improve the usability or operability of the aircraft.

An aircraft monitoring system for an electric or hybrid airplane is disclosed. The aircraft monitoring system can be constructed to enable the electric or hybrid aircraft to pass certification requirements relating to a safety risk analysis. The aircraft monitoring system can have different circuits for monitoring and alerting of failures of components of the electric or hybrid aircraft, and the failures that pose a greater safety risk can be monitored and indicated by at least one subsystem that does not rely on programmable components, so that certification of this subsystem would be easier. Even if a second subsystem that uses programmable components, such as processors or FPGA for example, redundantly monitors or displays the same failure, the certification requirement for this second redundant subsystem would be eased since the second subsystem is redundant.

The aircraft monitoring system can include a first battery monitoring circuit and a second battery monitoring circuit. The second battery monitoring can be supported by a housing and consist of non-programmable components. The housing can fly and be propelled by an electric motor. The non-programmable components can monitor a power source, such as a battery pack, supported by the housing and output a first alert to notify of a first condition associated with the power source. The power source can power the electric motor, and the first condition can be likely to imminently cause a fatality or a destruction of the housing. The first battery monitoring circuit can be supported by the housing and include a processor and a communication bus. The processor can monitor the power source from communications on the communication bus and output a second alert to notify of a second condition associated with the power source.

The aircraft monitoring system of the preceding paragraph can include one or more of the following features: The non-programmable components can consist of analog or combinational logic electronic components. The non-programmable components can consist of non-stateful components. At least one subsystem that is supported by the housing and configured to notify of catastrophic conditions can monitor for the catastrophic conditions and notify of the catastrophic conditions without using programmable components or stateful components, and the catastrophic conditions being likely to imminently cause the fatality or the destruction of the housing. The non-programmable components can activate an indicator supported by the housing to output the first alert, and the indicator can remain inactive unless the indicator is outputting the first alert. The indicator can include a light or an audible alarm. This subsystem can process analog signals and binary signals but may not multivalued digital signals. The monitoring subsystems can include multiple printed circuit boards, and at least part of the first subsystem and at least part of the second subsystem can be mounted on the multiple printed circuit boards. The first subsystem may not communicate via the communication bus. The non-programmable components can monitor a component using a first output from a first sensor, and the processor can monitor the component using a second output from a second sensor different from the first sensor. The first sensor and the second sensor can detect a state of the monitored component. The first sensor and the second sensor can measure a temperature of the component. The first sensor and the second sensor can detect an undervoltage condition, an overvoltage condition, an underpressure condition, an overpressure condition, an undercurrent condition, an overcurrent condition, an excessive internal resistance condition, a low internal resistance condition, a high temperature condition, or a low temperature condition of a monitored component. The first sensor and the second sensor can detect that the monitored component is on fire. The non-programmable components can output the first alert to the processor or another processor supported by the housing, and the processor or the another processor can activate a component supported by the housing to attempt to address the first condition. The non-programmable components can output the first alert to an electronic device remote from the housing. The non-programmable components and the processor can monitor the component using a common output from a sensor.

The first monitoring and warning subsystem can include a warning panel, such as light or loudspeaker, configured to present the first alert to the pilot or driver. The first alert can indicate that a crash of the housing is imminent.

The monitored component can include a battery pack. The first condition can be a failure or an overheating of the battery pack. The first condition can be the power pack being on fire. The non-programmable components can include an electronic device configured to process an analog signal.

This disclosure could apply to monitoring and warning for different components of an electric or hybrid airplane. For example, a first monitoring and warning subsystem could be used for detecting an warning catastrophic, or hazardous, failure conditions of a motor controller, while a second subsystem could be used for redundant monitoring of those catastrophic or hazardous failure conditions, and/or for monitoring and warning about less serious failure conditions, such as major, minor or no safety risk conditions of a motor controller. The first monitoring and warning subsystem can be composed of non-programmable, non-stateful components and thus avoids the difficulty of software certification, while the second monitoring and warning subsystem can include a processor or other programmable components, and output information to a sophisticated display for presentation.

The monitored component can include a motor. A first monitoring and warning subsystem can monitor various parameters of the motor, including for example a temperature, voltage, current, rotation frequency of the motor, and generate and display a warning signal in case of failure condition of the motor. At least some of those parameters, and/or additional parameters of the motors, can be monitored by a second monitoring and warning subsystem.

The monitored component can include a motor controller. A first monitoring and warning subsystem can monitor various parameters of the motor controller, including for example a temperature, voltage, current, electrical frequency in the motor controller, and generate and display a warning signal in case of failure condition of the motor controller. At least some of those parameters, and/or additional parameters of the motors, can be monitored by a second monitoring and warning subsystem.

The first subsystem might deactivate a faulty component when a condition related to this component has been detected. For example, a first subsystem might deactivate a battery pack, a battery cell, a motor coil, a complete motor, and/or a motor controller when a condition related to this component has been detected.

The first subsystem might leave a deactivated components unreplaced. In other situations, the first subsystem can automatically and without human intervention activate a backup component when a condition related to the primary component has been detected. For example, a first subsystem might activate a replacement battery pack, a replacement battery cell, a replacement motor coil, and/or a replacement motor controller when a condition related to a primary corresponding component has been detected.

The backup component that is activated in case of failure of the primary corresponding component might be more simple than the primary component, and be less effective.

The backup component might be easier to certify than the primary component. The backup component might be processorless.

A method of operating an aircraft monitoring system of an electric or hybrid airplane is disclosed. The aircraft monitoring system can be constructed to enable the electric or hybrid aircraft to pass certification requirements relating to a safety risk analysis. The method can include:
supporting a first subsystem by a housing, the first subsystem consisting of non-programmable components, the housing being configured to fly and be propelled by an electric motor;
monitoring with said first subsystem a component supported by the housing;
outputting with said first subsystem a first visual or auditive alert to notify of any catastrophic or hazardous failure condition associated with the component;
supporting a second subsystem by said housing, the second subsystem comprising programmable components;
monitoring with said second subsystem said component supported by the housing;
outputting with said second subsystem a second alert to notify of the same or other failure conditions associated with the component.

The method of the preceding paragraph can include one or more of the following features: The method can include activating an indicator supported by the housing to output a first alert, inactivating the indicator when the non-programmable components are not outputting the first alert, and presenting a second alert on a display supported by the housing.

The non-programmable components may monitor a component using a first output from a first sensor, and the processor may monitor the component using a second output from a second sensor.

The method can include, by the first sensor and the second sensor, detecting an undervoltage condition, an overvoltage condition, an underpressure condition, an overpressure condition, an undercurrent condition, an overcurrent condition, an excessive internal resistance condition, a low internal resistance condition, a high temperature condition, or a low temperature condition associated with the monitored component.

The method can include, responsive to the first alert, deactivating a component responsible for the failure condition.

The method can include activating a backup component supported by the housing to attempt to attempt to address the first condition.

The control system of the preceding paragraph can include one or more of the following features: The controller can vary a rotation rate of the motor or a pitch of a propeller supported by the housing to compensate for the failure of the one or more of the multiple field coils and maintain the power output despite the failure of the one or more of the multiple field coils.

The present disclosure provides multiple components and systems that can be mixed and matched according to aircraft needs and requirements. Accordingly, although multiple different components are described below, the components or systems are not required to be all used together in a single embodiment. Rather, each component or system can be used independent of the other components or systems of the present disclosure.

A method of making or using the modular power system of the preceding three paragraphs is disclosed.

DETAILED DESCRIPTION

System Overview

Figure 1A:
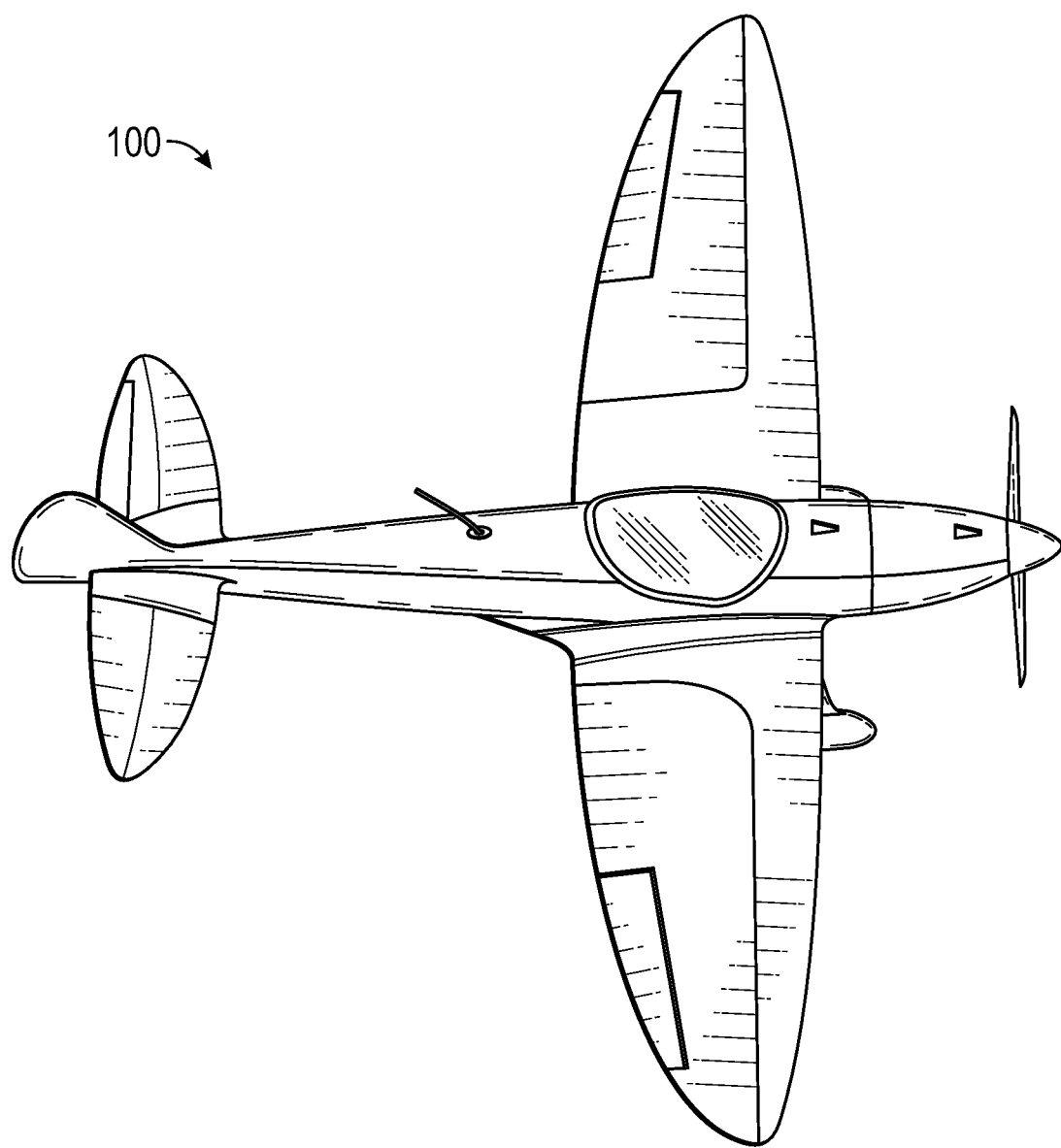
FIG. 1A illustrates an aircraft, such as an electric or hybrid aircraft.
Figure 1B:
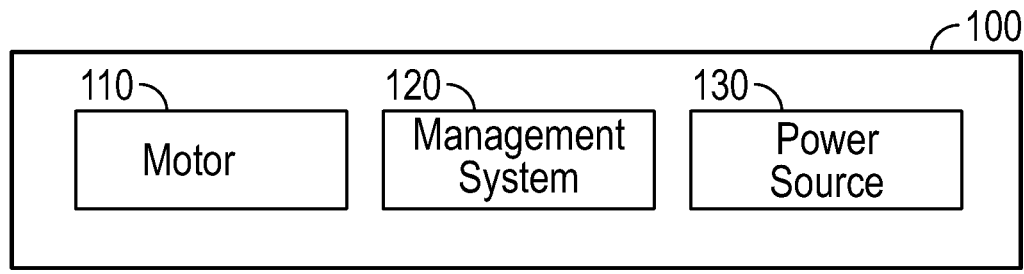
FIG. 1B illustrates a simplified block diagram of an aircraft.

FIG. 1A illustrates an aircraft 100, such as an electric or hybrid aircraft, and FIG. 1B illustrates a simplified block diagram of the aircraft 100. The aircraft 100 includes a motor 110, a management system 120, and a power source 130. The motor 110 can be used to propel the aircraft 100 and cause the aircraft 100 to fly and navigate. The management system 120 can control and monitor the components (equipment) of the aircraft 100, such as the motor 110 and the power source 130. The power source 130 can power the motor 110 to drive the aircraft 100 and power the management system 120 to enable operations of the management system 120. The management system 120 can include one or more motor controllers as well as other electronic circuitry for controlling and monitoring various components of the aircraft 100.

Figure 2:
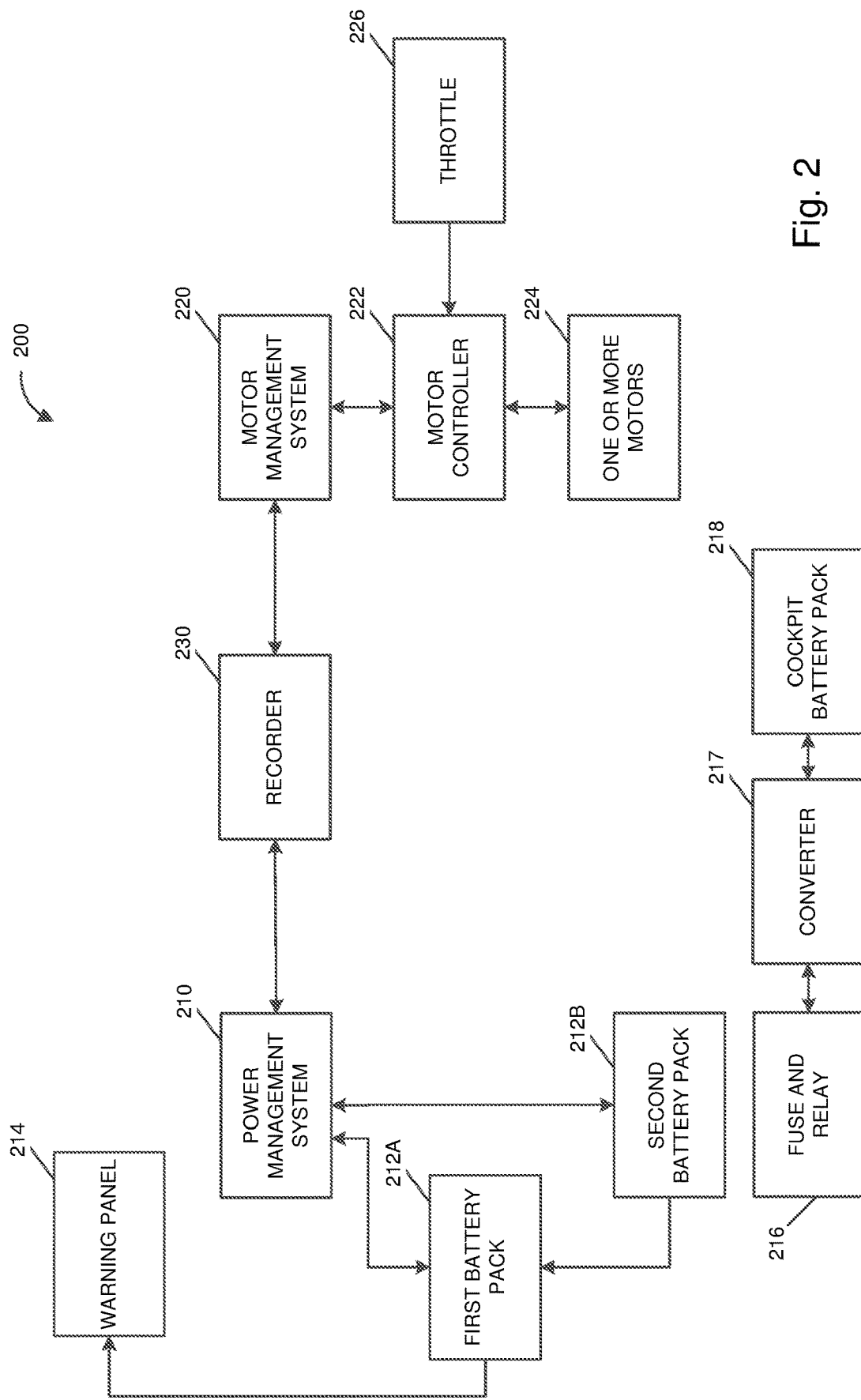
FIG. 2 illustrates management systems for operating an aircraft.

FIG. 2 illustrates components 200 of an aircraft, such as the aircraft 100 of FIGS. 1A and 1B. The components 200 can include a power management system 210, a motor management system 220, and a recorder 230, as well as a first battery pack 212A, a second battery pack 212B, a warning panel 214, a fuse and relay 216, a converter 217, a cockpit battery pack 218, a motor controller 222, one or more motors 224, and a throttle 226.

The power management system 210, the motor management system 220, and the recorder 230 can monitor communications on a communication bus, such as a controller area network (CAN) bus, and communicate via the communication bus. The first battery pack 212A and the second battery pack 212B can, for instance, communicate on the communication bus enabling the power management system 210 to monitor and control the first battery pack 212A and the second battery pack 212B. As another example, the motor controller 222 can communicate on the communication bus enabling the motor management system 220 to monitor and control the motor controller 222.

The recorder 230 can store some or all data communicated (such as component status, temperature, or over/undervoltage information from the components or other sensors) on the communication bus to a memory device for later reference, such as for reference by the power management system 210 or the motor management system 220 or for use in troubleshooting or debugging by a maintenance worker. The power management system 210 and the motor management system 220 can each output or include a user interface that presents status information and permits system configurations. The power management system 210 can control a charging process (for instance, a charge timing, current level, or voltage level) for the aircraft when the aircraft is coupled to an external power source to charge a power source of the aircraft, such as the first battery pack 212A or the second battery pack 212B.

The warning panel 214 can be a panel that alerts a pilot or another individual or computer to an issue, such as a problem associated with a power source like the first battery pack 212A. The fuse and relay 216 can be associated with the first battery pack 212A and the second battery pack 212B and usable to transfer power through a converter 217 (for example, a DC-DC converter) to a cockpit battery pack 218. The fuse and relay 216 can protect one or more battery poles of the first battery pack 212A and the second battery pack 212B from a short or overcurrent. The cockpit battery pack 218 may supply power for the communication bus.

The motor management system 220 can provide control commands to the motor controller 222, which can in turn be used to operate the one or more motors 224. The motor controller can include an inverter for generating AC currents that are needed for operating the one or more motors. The motor controller 222 may further operate according to instructions from the throttle 226 that may be controlled by a pilot of the aircraft. The one or more motors can include an electric brushless motor.

The power management system 210 and the motor management system 220 can execute the same or similar software instructions and may perform the same or similar functions as one another. The power management system 210, however, may be primarily responsible for power management functions while the motor management system 220 may be secondarily responsible for the power management functions. Similarly, the motor management system 220 may be primarily responsible for motor management functions while the power management system 210 may be secondarily responsible for the motor management functions. The power management system 210 and the motor management system 220 can be assigned respective functions, for example, according to system configurations, such as one or more memory flags in memory that indicate a desired functionality. The power management system 210 and the motor management system 220 may include the same or similar computer hardware.

The power management system 210 can automatically perform the motor management functions when the motor management system 220 is not operational (such as in the event of a rebooting or failure of the motor management system 220), and the motor management system 220 can automatically perform the power management functions when the power management system 210 is not operational (such as in the event of rebooting or failure of the power management system 210). Moreover, the power management system 210 and the motor management system 220 can take over the functions from one another without communicating operation data, such as data about one or more of the components being controlled or monitored by the power management system 210 and the motor management system 220. This can be because both the power management system 210 and the motor management system 220 may be consistently monitoring communications on the communication bus to generate control information, but the control information may be used if the power management system 210 and the motor management system 220 has primary responsibility but not if the power management system 210 and the motor management system 220 does not have primary responsibility. Additionally or alternatively, the power management system 210 and the motor management system 220 may access data stored by the recorder 230 to obtain information usable to take over primary responsibility.

System Architecture

Electric and hybrid aircraft (rather than aircraft powered during operation by combustion) have been designed and manufactured for decades. However, electric and hybrid aircraft have still not yet become widely used for most transport applications like carrying passengers or goods.

This failure to adopt may be in large part because designing an aircraft that is sufficiently safe to be certified by certification authorities may be very difficult. The certification of prototypes may moreover not be sufficient to certify for commercial applications. Instead, a certification of each individual aircraft and its components may be required.

This disclosure provides at least some approaches for constructing electric powered aircraft from components and systems that have been designed to pass certification requirements so that the aircraft itself may pass certification requirements and proceed to active commercial use.

Certification requirements can be related to a safety risk analysis. A condition that may occur with an aircraft or its components can be assigned to one of multiple safety risk assessments, which may in turn be associated with a particular certification standard. The condition can, for example, be catastrophic, hazardous, major, minor, or no safety effect. A catastrophic condition may be one that likely results in multiple fatalities or loss of the aircraft. A hazardous condition may reduce the capability of the aircraft or the operator ability to cope with adverse conditions to the extent that there would be a large reduction in safety margin or functional capability crew physical distress/excessive workload such that operators cannot be relied upon to perform required tasks accurately or completely or serious or fatal injury to small number of occupants of aircraft (except operators) or fatal injury to ground personnel or general public. A major condition can reduce the capability of the aircraft or the operators to cope with adverse operating condition to the extent that there would be a significant reduction in safety margin or functional capability, significant increase in operator workload, conditions impairing operator efficiency or creating significant discomfort physical distress to occupants of aircraft (except operator), which can include injuries, major occupational illness, major environmental damage, or major property damage. A minor condition may not significantly reduce system safety such that actions required by operators are well within their capabilities and may include a slight reduction in safety margin or functional capabilities, slight increase in workload such as routine flight plan changes, some physical discomfort to occupants or aircraft (except operators), minor occupational illness, minor environmental damage, or minor property damage. A no safety effect condition may be one that has not effect on safety.

An aircraft can be designed so that different monitoring and warning subsystems, such as battery monitoring circuits, of the aircraft are constructed to have a robustness corresponding to their responsibilities and any related certification standards, as well as potentially any subsystem redundancies.

Where a potential failure of the responsibilities of a monitoring and warning subsystem would likely be catastrophic, the subsystem can be designed to be simple and robust and thus may be able to satisfy difficult certification standards. The subsystem, for instance a battery, motor or motor controller monitoring circuit, can be composed of non-programmable, non-stateful components (for example, analog or non-programmable combinational logic electronic components) rather than programmable components (for example, a processor, a field programmable gate array (FPGA), or a complex programmable logic device (CPLD)) or stateful components (for example, sequential logic electronic components) and activate indicators such as lights rather than more sophisticated displays.

On the other hand, where either (i) a monitoring and warning subsystem (such as a battery monitoring circuit, a motor monitoring circuit or a motor controller monitoring circuit) of an aircraft monitors a parameter redundantly with another subsystem of the aircraft that is composed of non-programmable, non-stateful components or (ii) a potential failure of the responsibilities of such a monitoring and warning subsystem would likely be less than catastrophic, or less than hazardous, the subsystem can be at least partly digital and designed to be complicated, feature-rich, and easier to update and yet able to satisfy associated certification standards. Such a subsystem can, for instance, include a processor or other programmable components that outputs information to a sophisticated display for presentation.

In some implementations, some or all catastrophic conditions monitored for by an aircraft can be monitored for with at least one monitoring and warning subsystem that does not include a programmable component or a stateful component because certifications for programmable components or stateful components may demand statistical analysis of the responsible subsystems, which can be very expensive and complicated to certify. Such implementations can moreover be counterintuitive at least because an electric or hybrid aircraft may include one or more relatively advanced programmable or stateful components to enable operation of the electric or hybrid aircraft, so the inclusion of one or more subsystems in the aircraft that does not include any programmable components or any stateful components may be unexpected because the one or more relatively advanced programmable or stateful components may be readily and easily able to implement the functionality of the one or more subsystems that does not include any programmable components or any stateful components.

An aircraft monitoring system can include a first monitoring and warning subsystem and a second monitoring and warning subsystem. The second subsystem, such as a second battery monitoring circuit, can be supported by an aircraft housing and include non-programmable, non-stateful components, such as analog or non-programmable combinational logic electronic components. The non-programmable, non-stateful components can monitor a component (such as battery cells in a battery pack) supported by the aircraft housing and output a second alert to notify of a catastrophic condition associated with the component. The non-programmable, non-stateful components can, for instance, activate an indicator or an audible alarm for a passenger aboard the housing to output the first alert. The indicator or audible alarm may remain inactive unless the indicator is outputting the first alert. Additionally or alternatively, the non-programmable, non-stateful components can output the second alert to a computer aboard or remote from the aircraft (for example, to automatically trigger actions to attempt to respond to or address the catastrophic condition, such as to stop charging or activate a fire extinguisher, a parachute, or an emergency landing procedure or other emergency response feature) or an operator of the aircraft via a telemetry system. The non-programmable, non-stateful components may, moreover, not be able to control the component or at least control certain functionality of the component, such as to control a mode or trigger an operation of the component.

The first subsystem, such as a first battery monitoring circuit, can be supported by the aircraft housing and include a processor (or another programmable or stateful component), as well as a communication bus. The processor can monitor the component from communications on the communication bus and output a first alert to notify of a catastrophic condition or a less than catastrophic condition associated with the component. The processor can, for instance, activate an indicator or audible alarm for a passenger aboard the housing to output the first alert. Additionally or alternatively, the processor can output the first alert to a computer aboard or remote from the aircraft (for example, to automatically trigger actions to attempt to address the catastrophic condition, such as to activate a fire extinguisher, a parachute, or an emergency landing procedure) or an operator of the aircraft via a telemetry system. The processor may control the component.

The non-programmable, non-stateful components of the second subsystem additionally may not be able to communicate via the communication bus. It may not include any programmable communication circuit for allowing communication via such a bus.

An example of such a design and its benefits are next described in the context of battery management systems. Notably, the design can be additionally or alternatively applied to other systems of a vehicle that perform functions other than battery management, such as motor and motor control.

Battery Management Example

Battery packs including multiple battery cells, such as lithium-ion cells, can be used in electric cars, electric aircraft, and other electric self-powered vehicles. The battery cells may be connected in series or in parallel to deliver an appropriate voltage and current.

Battery cells in battery packs can be managed and controlled by battery management systems (BMS). A BMS can be a circuit that manages a rechargeable battery cell by controlling its charging and discharge cycles, preventing it from operating outside its safe operating area, balancing the charge between cells, or the like. BMS can also monitor battery parameters, such as the temperature, voltage, current, internal resistance, or pressure of the battery cell, and report anomalies. BMS can be provided by various manufacturers as discreet electronic components.

Damage to battery cells can be very serious incidents that may cause fire, explosions, or interruption of the powered circuit. Therefore, any damage to a battery in a vehicle, such as an electric airplane, may desirably be reported immediately and reliably to the pilot or driver of the vehicle. A reliable monitoring of battery cells by BMS can be critical for the safety of electric airplanes.

However, BMS can have failings in rare occurrences that cause problems with battery cells which may not be reported correctly. For example, an overvoltage or overtemperature condition can, in some situations, affect not only a battery cell, but also its BMS, so that the failure of the battery cell is either not detected or not reported correctly. Even if the BMS functions correctly, a connecting bus between the BMS and the cockpit might be defective and prevent warning signals from being transmitted.

In order to prevent this risk, battery cells can be monitored with a second, redundant BMS. If both BMS are of the same type, a defect or conception flaw that affects one BMS may also affect the redundant BMS as well, so that the gain in reliability can be limited. The present disclosure provides at least approaches to increase the reliability of the detection of malfunctions of battery cells in an electric vehicle, such as an electric aircraft. Redundant monitoring of parameters of each battery cell can be performed with two different circuits. Because a second, redundant monitoring circuit may include non-programmable, non-stateful components rather than processors, sequential logic electronic components, or programmable combinational logic electronic components, its certification can be easier, and its reliability may be increased. For example, because the second, redundant circuit may be processorless, may not include any sequential or programmable combinational logic electronic components, and may not rely on any software (for example, executable program code that is executed by a processor), its certification is made easier than if the second, redundant circuit relied on processors, sequential or programmable combinational logic electronic components, or software.

The second, redundant monitoring circuit can provide for a redundant monitoring of battery parameters and for a redundant transmission of those parameters, or warning signals depending on those parameters. The second battery monitoring system may transmit analog or binary signals but not multivalued digital signals. The second battery monitoring circuit may not manage the charge and discharge of battery cells, but instead provide for monitoring of battery parameters, and transmission of parameters or warning signals. Therefore, the second, redundant battery monitoring circuit can be made simple, easy to certify, and reliable.

Figure 3:
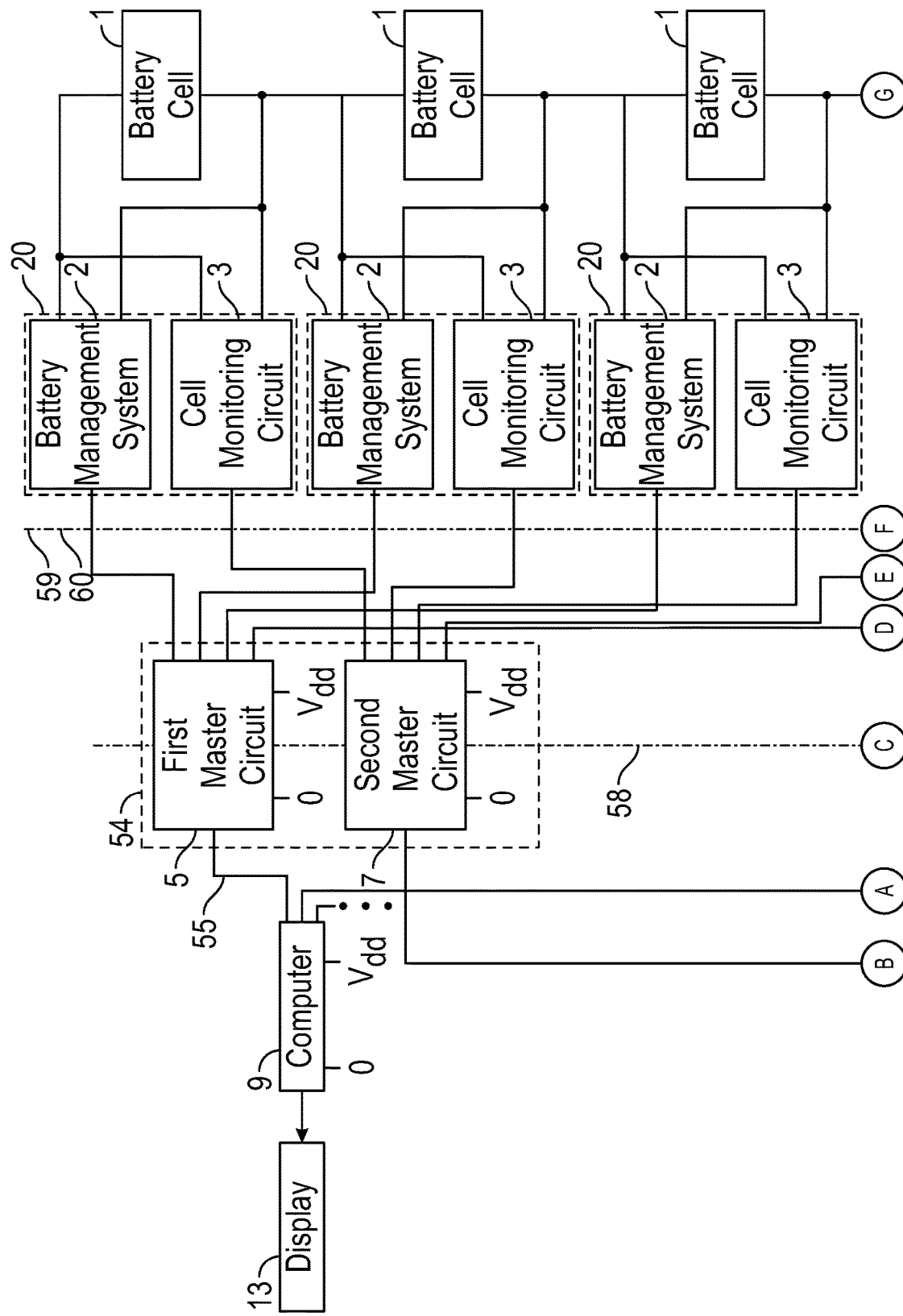
FIG. 3 illustrates an battery monitoring system for an aircraft.
Figure 3:
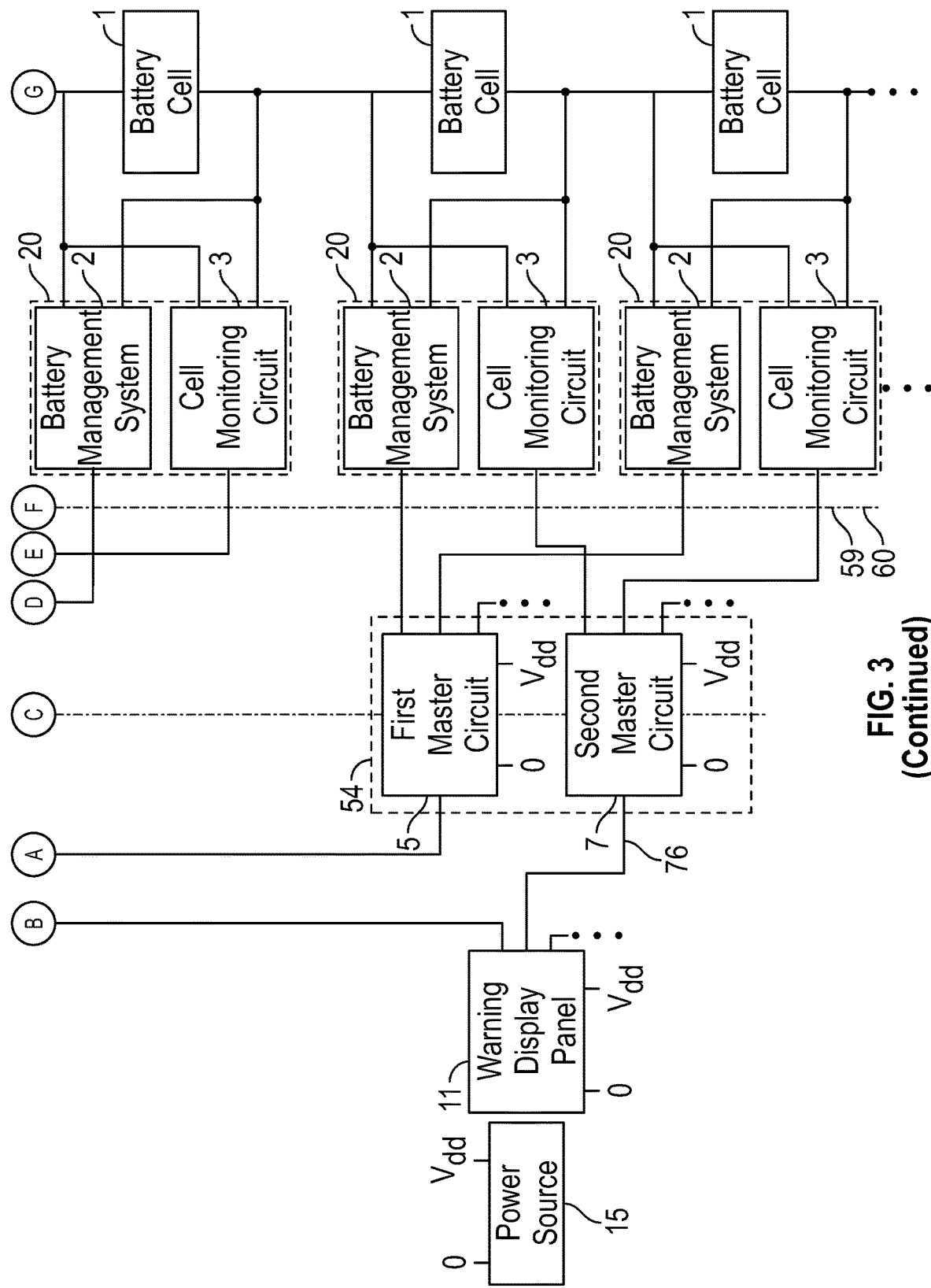

FIG. 3 illustrates a battery monitoring system. This system can be used in an electric vehicle, such as an electric aircraft, a large size drone or unmanned aerial vehicle, an electric car, or the like, to monitor the state of battery cells 1 in one of multiple battery packs and report this state or generate warning signals in case of dysfunctions.

The battery cells 1 can be connected in series or in parallel to deliver a desired voltage and current. FIG. 3 shows serially connected battery cells. The total number of battery cells 1 may exceed 100 cells in an electric aircraft. Each of the battery cells 1 can be made up of multiple elementary battery cells in parallel.

Figure 4:
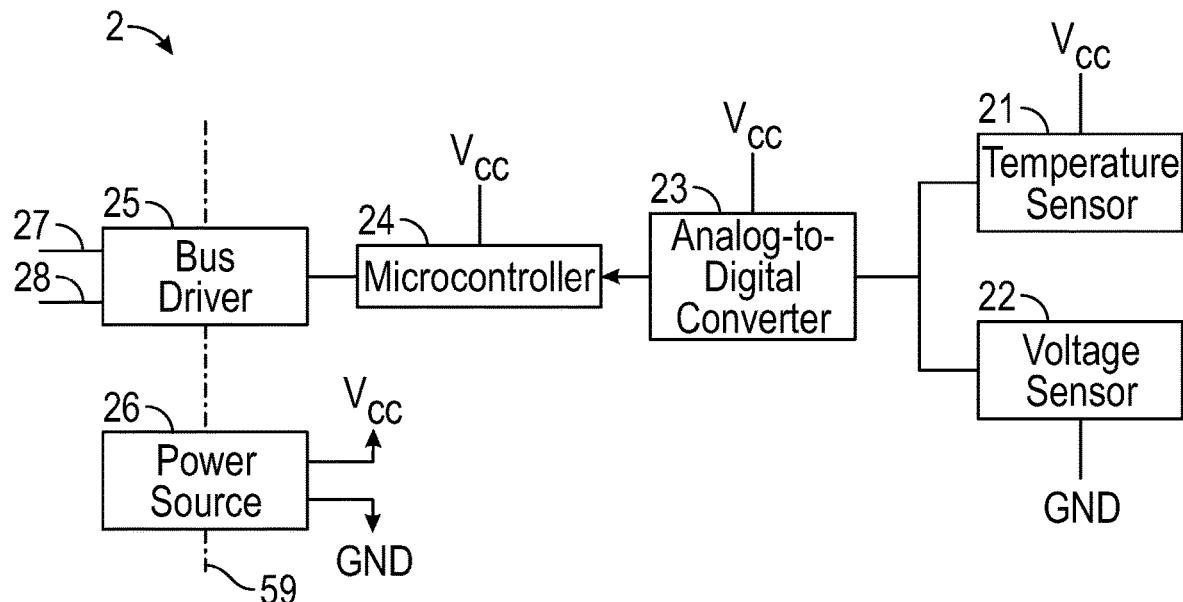
FIGS. 4 and 5 illustrate implementations of battery monitoring circuits.

A first battery monitoring circuit can control and monitor the state of each battery cell 1. The first battery management circuit can include multiple BMSs 2, each of the BMSs 2 managing and controlling one of the battery cells 1. The BMSs 2 can each be made up of an integrated circuit (for instance, a dedicated integrated circuit) mounted on one printed circuit board (PCB) of the PCBs 20. One of the PCBs 20 can be used for each of the battery cells 1 or for a group of battery cells. FIG. 4 illustrates example components of one of the BMSs 2.

The control of a battery cell can include control of its charging and discharge cycles, preventing a battery cell from operating outside its safe operating area, or balancing the charge between different cells.

The monitoring of one of the battery cells 1 by one of the BMSs 2 can include measuring parameters of the one of the battery cells 1, to detect and report its condition and possible dysfunctions. The measurement of the parameters can be performed with battery cell parameter sensors, which can be integrated in the one of the BMSs 2 or connected to the one of the BMSs 2. Examples of such parameter sensors can include a temperature sensor 21, a voltage sensor 22, or a current sensor. An analog-to-digital converter 23 can convert the analog values measured by one or more of the parameter sensors into multivalued digital values, for example, 8 or 16 bits digital parameter values. A microcontroller 24, which can be part of each of the BMSs 2, can compare the values with thresholds to detect when a battery cell temperature, battery cell voltage, or battery cell current is outside a range.

The BMSs 2 as slaves can be controlled by one of multiple first master circuits 5. In the example of FIG. 3, each of the first master circuits 5 can control four of the BMSs 2. Each of the first master circuits 5 can control eight of the BMSs 2, or more than eight of the BMSs 2. The first master circuits 5 can control more BMS and more battery cells in yet other implementations. The first master circuits 5 can be connected and communicate over a digital communication bus 55.

The first master circuits 5 can also be connected to a computer 9 that collects the various digital signals and data sent by the first master circuits 5, and may display information related to the battery state and warning signals on a display 13, such as a matrix display. The display 13 may be mounted in the vehicle's cockpit to be visible by the vehicle's driver or pilot. Additionally or alternatively, the computer 9 can output the information to a computer remote from the aircraft or to control operations of one or more components of the aircraft as described herein.

The BMSs 2 can be connected to the first master circuits 5 over a digital communication bus, such as a CAN bus. A bus driver 25 can interface the microcontroller 24 with the digital communication bus and provide a first galvanic isolation 59 between the PCBs 20 and the first master circuits 5. In one example, the bus drivers of adjacent BMSs 2 can be daisy chained. For example, as shown in FIG. 4, the bus driver 25 is connected to the bus driver 27 of the previous BMS and to the bus driver 28 of the next BMS.

Each of the BMSs 2 and their associated microcontrollers can be rebooted by switching its power voltage Vcc. The interruption of Vcc can be controlled by the first master circuits 5 over the digital communication bus and a power source 26.

Figure 6:
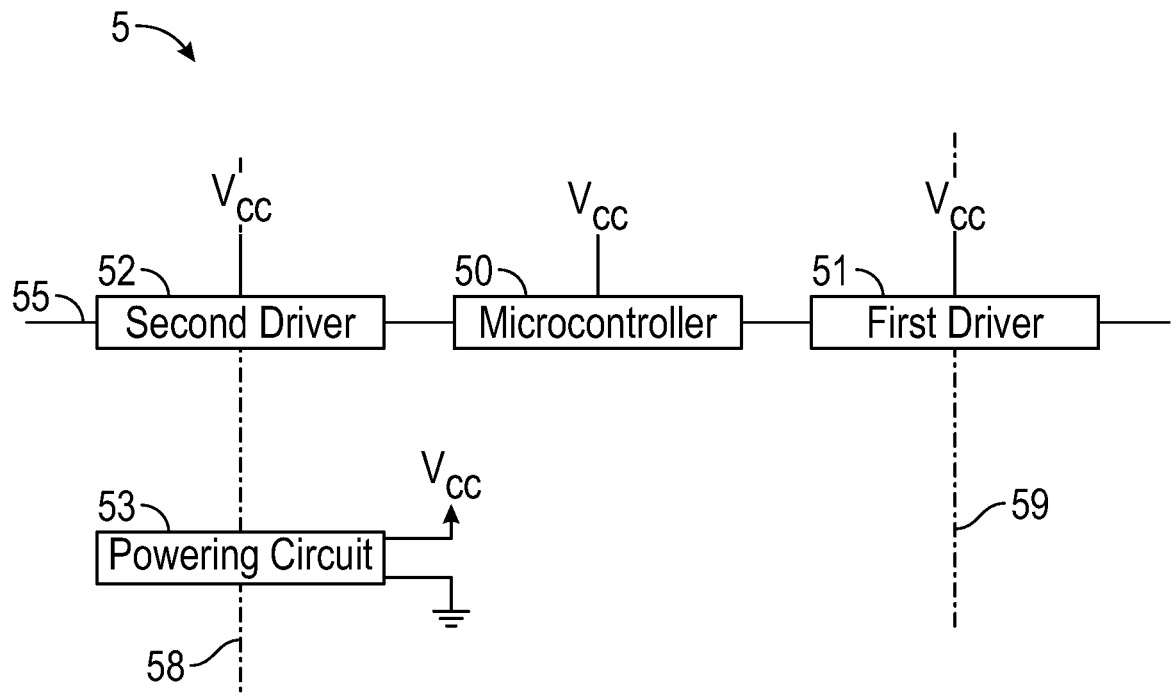
FIGS. 6 and 7 illustrate implementations of master circuits for monitoring battery monitoring circuits.

FIG. 6 illustrates example components of one of the first master circuits 5. The one of the first master circuits 5 can include a first driver 51 for connecting the one of the first master circuits 5 with one of the BMSs 2 over the digital communication bus, a microcontroller 50, and a second driver 52 for connecting the first master circuits 5 between themselves and with the computer 9 over a second digital communication bus 55, such as a second CAN bus. A second galvanic isolation 58 can be provided between the first and second master circuits 5, 7 and the computer 9. The second galvanic isolation 58 can, for example, be 1500 VDC, 2500 Vrms, 3750 Vrms, or another magnitude of isolation. The microcontroller 50, the first driver 51, and the second driver 52 can be powered by a powering circuit 53 and may be mounted on a PCB 54, one such PCB can be provided for each of the first master circuits 5.

FIG. 3 further illustrates a second battery monitoring circuit, which can be redundant of the first battery monitoring circuit. This second battery monitoring circuit may not manage the battery cells 1; for example, the second battery monitoring circuit may not control charge or discharge cycles of the battery cells 1. The function of the second battery monitoring circuit can instead be to provide a separate, redundant monitoring of each of the battery cells 1 in the battery packs, and to transmit those parameters or warning signals related to those parameters, such as to the pilot or driver or a computer aboard or remote from the aircraft as described herein. The second battery monitoring circuit can monitor the state of each of the battery cells 1 independently from the first battery monitoring circuit. The second battery monitoring circuit can include one of multiple cell monitoring circuits 3 for each of the battery cells. The parameters or warning signals may moreover, for example, be used by the second battery monitoring circuit to stop charging (for instance, by opening a relay to disconnect supply of power) of one or more battery cells when the one or more battery cells may be full of energy and a computer of the aircraft continues to charge the one or more battery cells.

Figure 5:
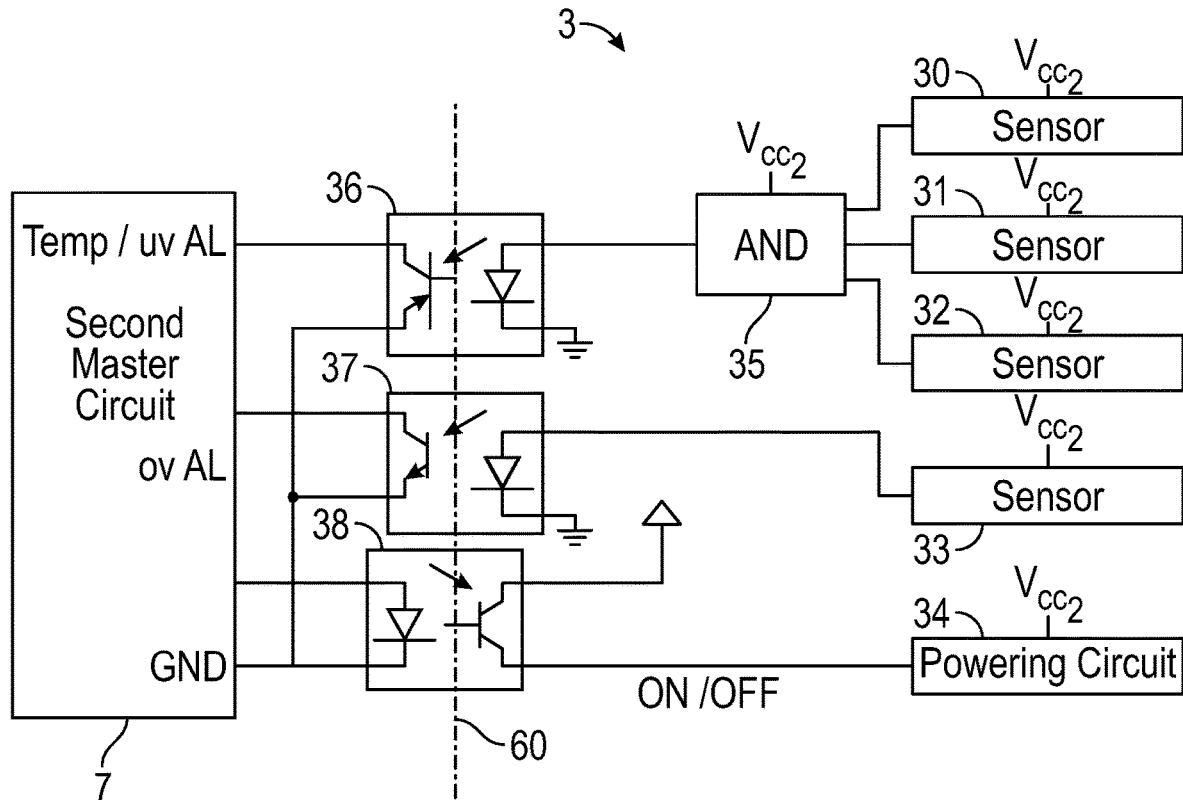

FIG. 5 illustrates example components of one of the cell monitoring circuits 3. Each of the cell monitoring circuits 3 can include multiple cell parameter sensors 30, 31, 32, 33 for measuring various parameters of one of the battery cells 1. The sensor 30 can measure a first temperature at a first location in one battery cell and detect an overtemperature condition; the sensor 31 can measure a second temperature at a second location in the same battery cell and detect an overtemperature condition; the sensor 32 can detect an undervoltage condition in the same battery cell; and the sensor 33 can detect an overvoltage condition on the same battery cell. The undervoltage condition can be detected, for example, when the voltage at the output of one battery cell is under 3.1 Volts or another threshold. The overvoltage condition might be detected, for example, when the voltage at the output of one battery cell is above 4.2 Volts or yet another threshold. The thresholds used can depend, for instance, on the type of battery cell 1 or a number of elementary cells in the cell. Therefore, each or some of the sensors 30-33 can include a sensor as such and an analog comparator for comparing the value delivered by the sensor with one or two thresholds, and outputting a binary value depending on the result of the comparison. Other battery cell parameter sensors, such as an overcurrent detecting sensor, can be used in other implementations.

Various parameters related to one of the battery cells 1 can be combined using a combinational logic circuit 35, such as an AND gate. The combinational logic circuit 35 may not include programmable logic. In the example of FIG. 5, binary signals output by the sensors 30, 31, and 32 are combined by a boolean AND gate into a single warning signal, which can have a positive value (warning signal) if and only if the temperature measured by the two temperature sensors exceeds a temperature threshold and if the voltage of the cell is under a voltage threshold. The detection of an overvoltage condition by the sensor 33, in the example of FIG. 5, may not combined with any other measure and can be directly used as a warning signal.

The warning signals delivered by the combinational logic 35 or directly by the parameter sensors 30-33 can be transmitted to a second master circuit 7 over lines 76, which can be dedicated and different from the digital communication bus used by the first battery monitoring circuit. Optocouplers 36, 37, 38 provide a third galvanic isolation 60 between the components 30-38 and the second master circuit 7. The third galvanic isolation 60 can provide the same isolation as the first galvanic isolation 59, such as 30V isolation, or the third galvanic isolation 60 may provide a different isolation form the first galvanic isolation 59.

The sensors 30-33 and the combinational logic element 35 can be powered by a powering circuit 34 that delivers a power voltage Vcc2. This powering circuit 34 can be reset from the second master circuit 7 using an ON/OFF signal transmitted over the optocoupler 38.

The sensors 30-33 and the combinational logic element 35 can be mounted on a PCB. One such PCB can be provided for each of the battery cells 1. The sensors 30-33 and the combinational logic element 35 can be mounted on the same PCB 20 as one of the BMSs 2 of the first battery monitoring circuit.

Figure 7:
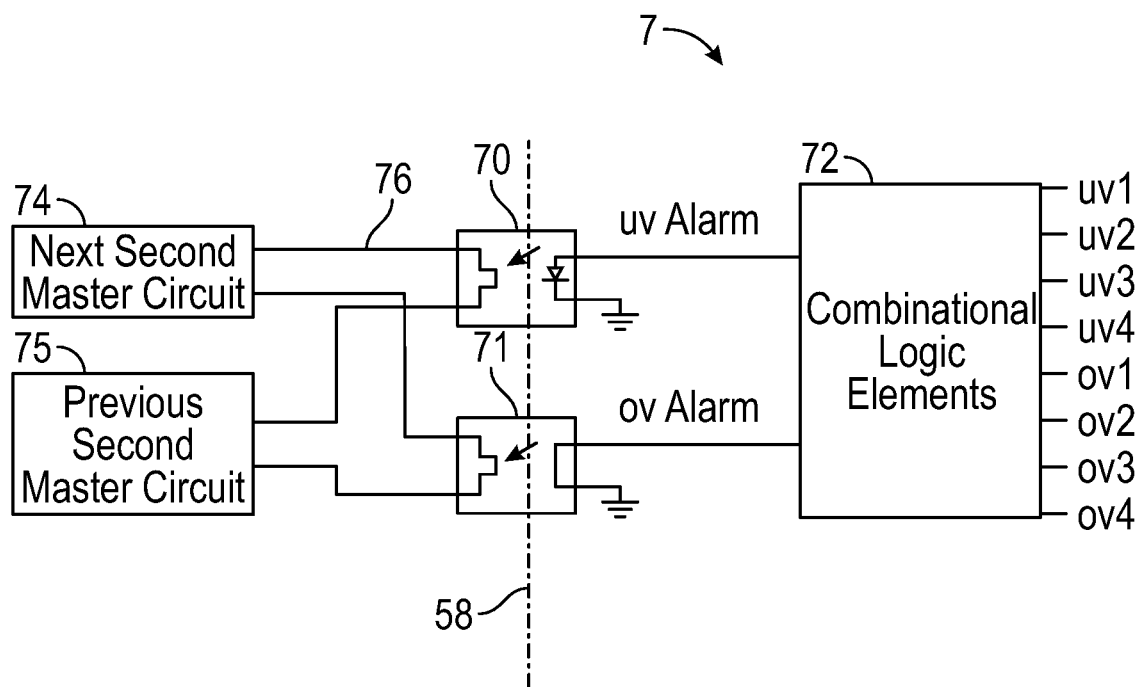

FIG. 7 illustrates example components of one of the second master circuits 7. In the example of FIG. 5, the one of the second master circuits 7 can include a combinational logic element 72, which may not include programmable logic, for combining warning signals, such as overtemperature/under-voltage warning signals uv1, uv2, . . . or overvoltage signals ov1, ov2, . . . from different battery cells into combined warning signals, such as a general uv (undervoltage condition in case of overtemperature) warning signal and a separate overvoltage warning signal ov. Those warning signals uv, ov can be active when any of the battery cells 1 monitored by the one of the second master circuits 7 has a failure. They can be transmitted over optocouplers 70, 71 and lines 76 to the next and previous second master circuits 74, 75, and to a warning display panel 11 in the cockpit of the vehicle for displaying warning signals to the driver or pilot. The warning display panel 11 can include lights, such as light emitting diodes (LEDs), for displaying warning signals.

With the disclosed design of the cell monitoring circuits 3 and the second master circuits 7, no dormant alarms may remain undetected. For example, if a cable may be broken or a power supply is inactive, the warning panel 11 can correctly show an alarm despite the broken cable or the inactive power supply. This can be accomplished, for instance, by using an inverted logic so that if the warning panel 11 does not receive a voltage or a current on an alarm line, an indicator may activate, but if the warning panel 11 does receive the voltage or the current on the alarm line, the indicator can deactivate.

The one of the second master circuits 7 can be mounted on a PCB. One such PCB can be provided for each of the second master circuits 7. One of the second master circuits 7 can be mounted on the same PCB 54 as one of the first master circuits 5 of the first battery monitoring circuit.

As can be seen, the second battery monitoring circuit can include exclusively non-programmable, non-stateful components (such as, analog components or non-programmable combinational logic components). The second battery monitoring circuit can be processorless, and may not include any sequential or programmable combinational logic. The second battery monitoring circuit may not run any computer code or be programmable. This simplicity can provide for a very reliable second monitoring circuit, and for a simple certification of the second battery monitoring circuit and an entire system that include the second battery monitoring circuit.

The second battery monitoring circuit can be built so that any faulty line, components, or power source triggers an alarm. In one example, an "0" on a line, which may be caused by the detection of a problem in a cell or by a defective sensor, line, or electronic component, can be signaled as an alarm on the warning panel; the alarm may only be removed when all the monitored cells and all the monitoring components are functioning properly. For example, if the voltage comparator or temperature sensor is broken, an alarm can be triggered.

The computer 9, the display 13, and the warning display panel 11 in the cockpit can be powered by a power source 15 in the cockpit, which may be a cockpit battery and can be independent of other power sources used to power one or more other components.

Monitoring and Warning about Failure Conditions

As indicated, the aspects, blocks and circuits that have been described so far in the context of battery monitoring systems could apply to monitoring and warning for different components of an electric or hybrid airplane. For example, a first monitoring and warning subsystem could be used for detecting an warning catastrophic, or hazardous, failure conditions of a motor or motor controller, while a second subsystem could be used for redundant monitoring of those catastrophic or hazardous failure conditions, and/or for monitoring and warning about less serious failure conditions, such as major, minor or no safety risk conditions of an electric motor or motor controller. The first monitoring and warning subsystem can be composed of non-programmable, non-stateful components and thus easier to certify, while the second monitoring and warning subsystem can include a processor or other programmable components, and output information to a sophisticated display 13, via a computer 9, for presentation.

Figure 21:
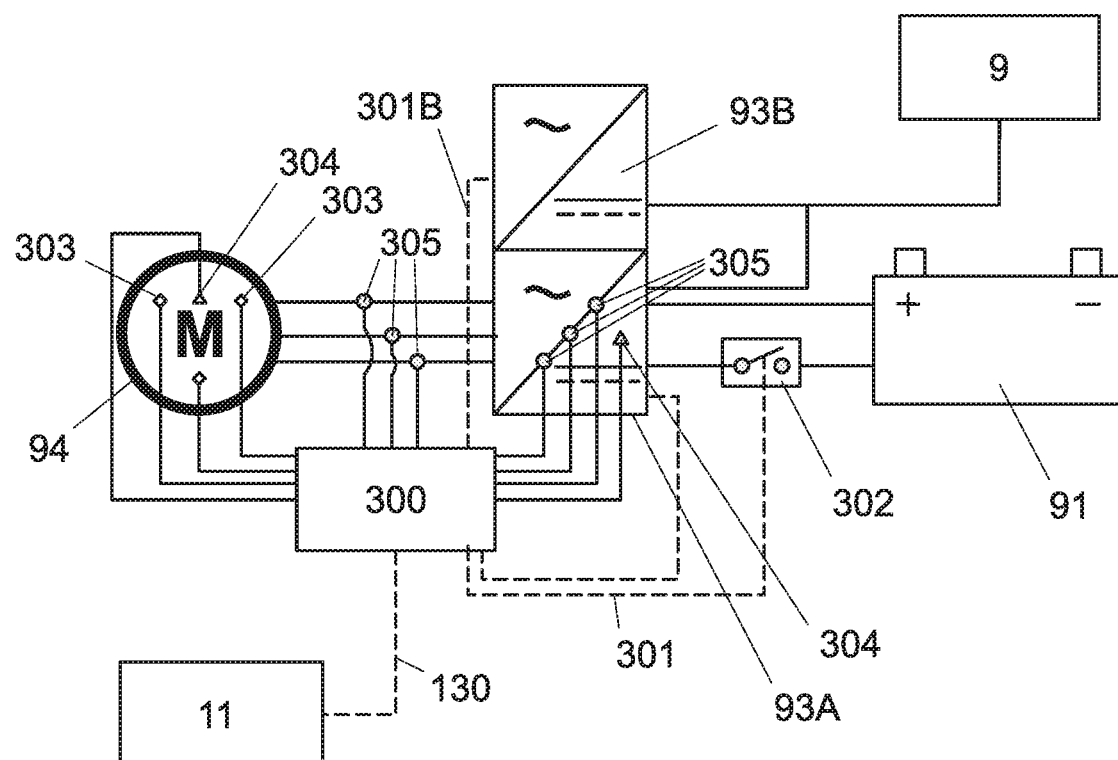
FIG. 21 illustrates an aircraft monitoring system for an electric or hybrid airplane.

FIG. 21 illustrates an example of system including at least one electric motor 94 for driving a (thrust-generating) propeller or a (lift-generating) rotor, in order to move an aircraft. The at least one motor 94 is controlled by a first motor controller 93A, or, in case of failure of the first motor controller 93A, by a backup motor controller 93B. The motor controller converts the DC electrical currents from the power source 91 into AC currents for powering the phases of the at least one motor.

Many failures of a motor 94 are catastrophic or hazardous conditions, since a motor that does not work properly cannot drive the propeller, or might even damage the propeller or the aircraft. It is therefore required to monitor any such failure condition and to warn the pilot or driver. The system includes a first subsystem 300, such as an analog monitoring and warning subsystem that does not include any programmable components, in order to detect any such failure condition. The first subsystem 300 might include at least one temperature sensor 304 for monitoring the temperature of the motor, as well as position, speed and/or rotation speed sensors 303 for detecting the position, speed, sense of rotation, and/or rotation frequency of the rotor of the motor, or of the axis of the propeller. Any failure condition that is detected by the first subsystem will generate a visual and/or auditive alarm with a light or loudspeaker on a warning display panel 11 in the cockpit, connected to the first subsystem 130 over a line 130, such as an analog line. The first subsystem 300 can be located at least partly in the motor controller, or entirely outside of the motor controller.

Other failures conditions that might be monitored by the first subsystem 300 include catastrophic or failure conditions of the at least one motor controller 93A. Parameters of the motor controller(s), such as for example the temperature, voltages, currents and/or electric frequencies, are therefore monitored with at least one temperature sensor 304 and/or voltage, current or frequency sensors 305. The first subsystem 300 monitors signals provided by those sensors, determines if or when a catastrophic condition occurs, and, in case of condition has been detected, generates a visual and/or auditive alarm with a light or loudspeaker on a warning display panel 11 in the cockpit, connected to the first subsystem 130 over a line 130, such as an analog line.

As an example, parameters that can result in catastrophic failures include overspeed of the propeller or wrong rotation sense of the propeller. This can be determined by the first subsystem by determining the phase activation sequence. The speed of the propeller can be measured with sensors or derived from the phase activation frequency or back-emf signal.

A common first subsystem 300 might be used for monitoring the at least one motor 94 and the at least one motor controller 93A. Alternatively, a separate first subsystem might be used for the at least one motor and for the at least one motor controller, or for each motor and/or for each motor controller.

A second monitoring and warning subsystem (not shown) is used for redundantly monitoring at least some of the above-mentioned parameters of the motor(s) or motor controller(s), and for monitoring other parameters of those motor(s) and motor controller(s). This second subsystem can include programmable components, such as processor, and other programmable components, such as sensorless devices for detecting the position, speed and/or frequency of one motor, or other parameters. The second system redundantly monitors catastrophic or hazardous conditions, and monitors less serious conditions, in order to generate a warning signal over a bus, such as a CAN-bus, to a board computer 9 that displays it to the pilot or driver.

In one embodiment, the second subsystem uses at least some of the components of the motor controller which has its own sensing and monitoring means used to drive the motor. The sensing means are sending information and warnings on the CAN bus and can therefore perform at least some of the methods of the second subsystem.

The first subsystem 300 might deactivate a faulty component when a condition related to this component has been detected. For example, a first subsystem might deactivate a battery pack, a battery cell, a motor coil, a complete motor, and/or a motor controller 93A when a condition related to this component has been detected. In the example of FIG. 21, the first subsystem might shut down the motor controller 93A with the power switch 302 controlled by line 301, when a condition related to this motor controller has been detected.

The first subsystem 300 might activate a backup component when a condition related to the primary component has been detected. For example, a first subsystem might activate a replacement battery pack, a replacement battery cell, a replacement motor coil, and/or a replacement motor controller 93A when a condition related to a primary corresponding component has been detected. In the example of FIG. 21, the first subsystem might power on the backup motor controller 93B when a condition related the primary motor controller 93A has been detected, and after the shut down of this primary motor controller 93A.

The backup component that is activated in case of failure of the primary corresponding component might be more simple than the primary component, and be less effective. For example, the backup motor controller 93B might be more simple than the primary motor controller it replaces in case of failure. In one example, the primary motor controller 93A operates in field-oriented control and controls the currents of the electric motor 94 using vectors for representing two orthogonal components of the current, while the backup, replacement motor controller 93B uses a scalar control of the currents. The backup motor controller 93B is thus less efficient, but it is also easier to certify since it does not require a microprocessor or any other programmable logic for computing the currents applied to the different phases of the motor 94. Even if the backup motor controller has a processor and sensing means, they could be made simpler and easier to certify than the ones of the primary motor controller.

Figure 22:
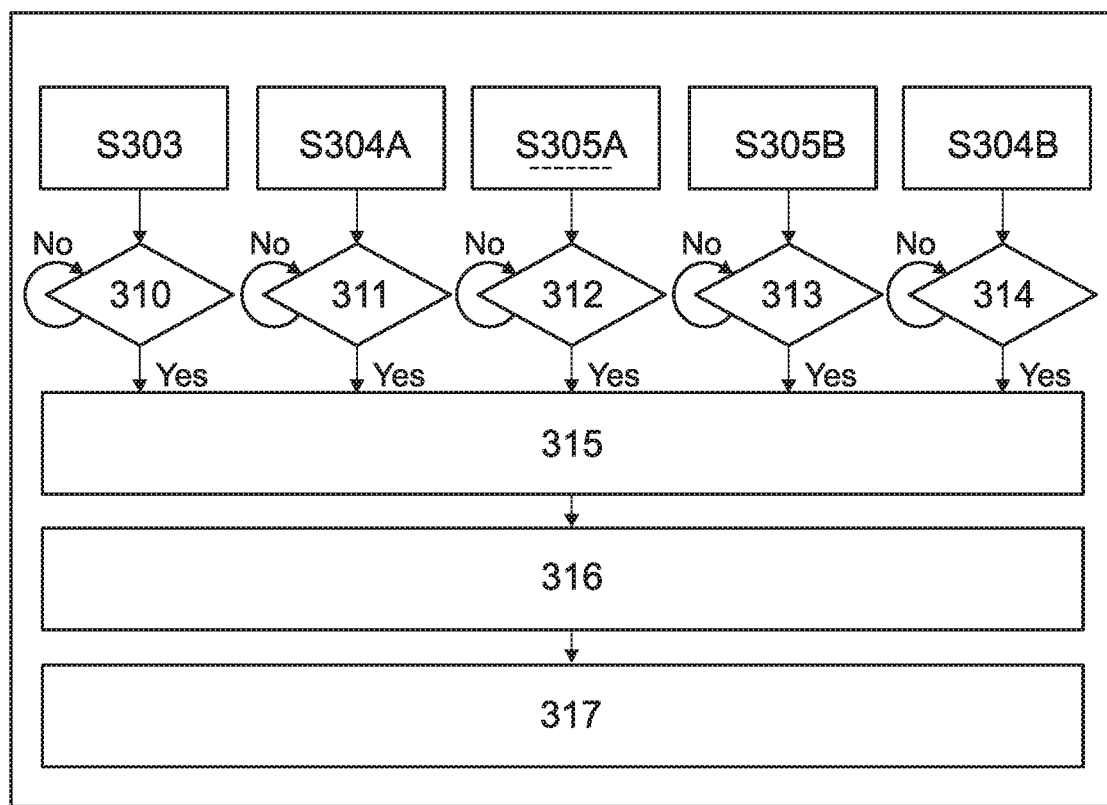
FIG. 22 illustrates a process for monitoring different pieces of components in an electric or hybrid airplane, activating alarms in case of failure condition, deactivating the faulty component, and/or activating a backup component.

FIG. 22 illustrates possible method for monitoring failure conditions of at least one motor and at least one motor controller in the system of FIG. 21.

At step S303, the monitoring and warning subsystem 300 monitors the rotation frequency (rotation speed) of one motor 94, using for example an encoder 303 in the motor, on an axis driven by the motor, by measuring the frequency of an electric signal representing this frequency, etc. This rotation frequency is compared at step 310 with a threshold, in order to detect when the rotation speed is too high.

At step S304A, the monitoring and warning subsystem 300 determines the phase activation sequence, and use this result to determine at step 311 when the motor rotates in the wrong sense.

At step S305A, the monitoring and warning subsystem 300 monitors at least one voltage, for example a voltage in the motor 94, on one of the cables connected to one phase of a motor, or in one motor controller 93A. This voltage is compared with a threshold at step 312 in order to detect when the voltage is too high, or outside an expected range.

At step S305B, the monitoring and warning subsystem 300 monitors at least one current, for example a current in the motor 94, in one of the cables connected to one phase of a motor, or in one motor controller 93A. This current is compared with a threshold at step 313 in order to detect when the current is too high, or outside an expected range.

At step S304B, the monitoring and warning subsystem 300 monitors at least one temperature, for example a temperature in the motor 94 or in one motor controller 93A. This temperature is compared with a threshold at step 314 in order to detect when the temperature is too high.

Other parameters might be monitored by the first monitoring and warning subsystem 300, or by another first monitoring and warning subsystem.

If any of the conditions monitored at steps 310 to 314 occurs, the first monitoring and warning subsystem 300 generates and displays at step 315 a visual and/or auditive alarm on a warning display panel 11 in the cockpit. Again, the monitoring and warning occurs without any programmable component between the parameter sensor until the light or loudspeaker as warning panel.

At step 316, the first monitoring and warning subsystem 300 might deactivate the faulty component, i.e., the component in which an overtemperature, overcurrent, overvoltage or other faulty parameters has been detected. In the embodiment of FIG. 21, the subsystem 300 can deactivate a faulty primary motor controller 93A when a failure condition, such as for example an overtemperature, overcurrent, overvoltage, or wrong sense of rotation, has been detected in relation with that controller.

Depending on the conditions that has been detected, and/or on other parameters, a deactivated component might be replaced, or not. For example, a motor that does not work properly might be deactivated without being replaced if the aircraft is able to land properly without one motor.

However, the first monitoring and warning subsystem 300 might replace at step 317 a deactivated faulty component with a backup component. In the embodiment of FIG. 21, the subsystem 300 can replace a deactivated faulty primary motor controller 93A with a backup motor controller 93B, for example a more simple, less efficient motor controller.

the first monitoring and warning subsystem 300 may also deactivate a control board of the motor controller and activate a backup control board using no software or a simpler microcontroller with limited software.

Motor and Battery System

Battery packs including multiple battery cells, such as lithium-ion cells, can be used in electric cars, electric aircraft, and other electric self-powered vehicles. The battery cells can be connected in series or in parallel to deliver an appropriate voltage and current.

In electrically driven aircraft, the battery packs can be chosen to fulfill the electrical requirements for various flight modes. During short time periods like take off, the electrical motor can utilize a relatively high power. During most of the time, such as in the standard flight mode, the electrical motor can utilize a relatively lower power, but may consume a high energy for achieving long distances of travel. It can be difficult for a single battery to achieve these two power utilizations.

The use of two battery packs with different power or energy characteristics can optimize the use of the stored energy for different flight conditions. For example, a first battery pack can be used for standard flight situations, where high power output may not be demanded, but a high energy output may be demanded. A second battery pack can be used, alone or in addition to the first battery pack, for flight situations with high power output demands, such as take-off maneuvering.

An electrical powering system can charge the second battery pack from the first battery pack. This can allow recharging of the second battery pack during the flight, subsequent to the second battery pack being used in a high power output demanding flight situation. Therefore, the second battery pack can be small, which can save space and weight. In addition, this can allow different battery packs for different flight situations that optimize the use of the battery packs.

The electrical powering system can also charge the second battery pack by at least one motor which works as generator (the motor may also accordingly be referred to as a transducer). This can allow recharging of the second battery pack during the flight or after the second battery pack has been used in a high power output demanding flight situation. Therefore, the second battery pack can be small, which can save space and weight. In addition, the different battery packs can allow the recovery of braking energy. Braking energy during landing or sinking recovered by a generator motor can create high currents which may not be recovered by battery packs used for traveling long distances. By using a second battery pack suitable for receiving high power output in a short time, more braking energy can be recovered via the second battery pack than the first battery pack, for example.

The electrical powering system can also include a third battery pack, which includes a supercapacitor. Because supercapacitors can receive and output large instantaneous power or high energy in a short duration of time, the third battery pack can further improve the electrical powering system in some instances. A supercapacitor may, for example, have a capacitance of 0.1 F, 0.5 F, 1 F, 5 F, 10 F, 50 F, 100 F, or greater or within a range defined by one of the preceding capacitance values.

FIGS. 8 to 13 illustrate multiple electrical power systems.

Figure 8:
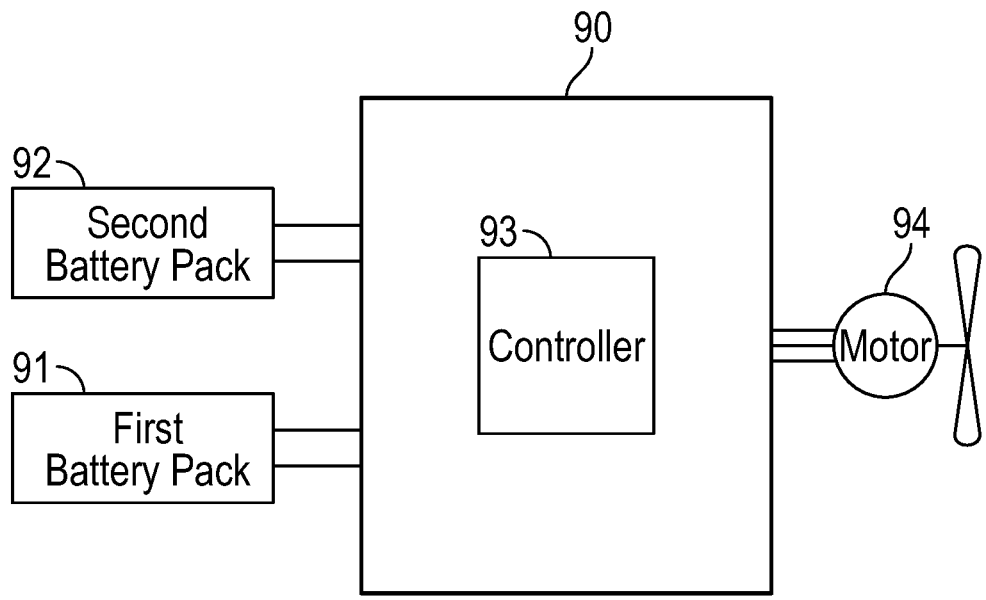
FIGS. 8, 9, 10, 11, 12, and 13 illustrate schematic views of implementations of a power management system.

FIG. 8 shows an electrical powering system that includes a first battery pack 91, a second battery pack 92, a circuit 90, and at least one motor 94.

The first battery pack 91 and the second battery pack 92 can each store electrical energy for driving the at least one motor 94. The first battery pack 91 and the second battery pack 92 can have different electrical characteristics. The first battery pack 91 can have a higher energy capacity per kilogram than the second battery pack 92, and the first battery pack 91 can have a higher power capacity (watt hours) than the second battery pack 92. Moreover, the first battery pack 91 can have a lower maximum, nominal, or peak power than the second battery pack 92; the first battery pack 91 can have a lower maximum, nominal, or peak current than the second battery pack 92; or, the first battery pack 91 can have a lower maximum, nominal, or peak voltage than the second battery pack 92. More than one or even all of the mentioned electrical characteristics of the first battery pack 91 and the second battery pack 92 can be different. However, only one of the mentioned electrical characteristics may be different or at least one other characteristic than the mentioned electrical characteristics may be different. The first battery pack 91 and the second battery pack 92 can have the same electrical characteristics.

The type or the material composition of the battery cells of the first battery pack 91 and the second battery pack 92 can be different. The type or the material composition of the battery cells of the first battery pack 91 and the second battery pack 92 can be the same, but an amount of copper or an arrangement of conductors can be different. In one example, the first battery pack 91 or the second battery pack 92 can be a lithium-ion (Li-ion) battery or a lithium-ion polymer (Li—Po) battery. The second battery pack 92 may include a supercapacitor (sometimes referred to as a supercap, ultracapacitor, or Goldcap).

The first battery pack 91 can include relatively high energy-density battery cells that can store a high amount of watt-hours per kilogram. The first battery pack 91 can include low power battery cells. The first battery pack 91 can provide a DC voltage/current/power or can be connected by a (two phase or DC) power line with the circuit 90.

The second battery pack 92 can include relatively low energy-density battery cells. The second battery pack 92 can include relatively high power battery cells. The second battery pack 92 can provide a DC voltage/current/power or is connected by a (two phase or DC) power line with the circuit 90.

The first battery pack 91 can form an integrated unit of mechanically coupled battery modules or the first battery pack 91 may be an electrically connected first set of battery modules. Similarly, the second battery pack 92 can form an integrated unit of mechanically coupled battery modules or the second battery pack 92 may be an electrically connected second set of battery modules. Some or all of the battery modules of each of first battery pack 91 or the second battery pack 92 can be stored in one or more areas of a housing of an aircraft, such as a within a wing or nose of the aircraft.

The first battery pack 91 can have a total energy capacity that exceeds a total energy capacity of the second battery pack 92. For example, a ratio of the total energy capacity of the first battery pack 91 and the total energy capacity of the second battery pack 92 can be 2:1, 3:1, 4:1, 5:1, 10:1, 20:1, 40:1, or 100:1 or within a range defined by two of the foregoing ratios.

The electrical powering system can include an external charging interface for charging the first battery pack 91 or the second battery pack 92 when the aircraft is on the ground and connected to a charging station outside of the aircraft.

Each, some, or one of the at least one motor can be an electrical motor. The at least one motor 94 can be connected to the circuit 90. The at least one motor 94 can receive over the circuit 90 electrical energy/power from the first battery pack 91 or the second battery pack 92 to drive the at least one motor 94. For example, the at least one motor 94 can be a three phase motor, such as a brushless motor, which is connected via a three phase AC power line with the circuit 90. However, the at least one motor 94 can instead be a different type of motor, such as any type of DC motor or a one phase AC motor. The at least one motor 94 can move a vehicle, such as an airborne vehicle like an aircraft. The at least one motor 94 can drive a (thrust-generating) propeller or a (lift-generating) rotor. In addition, the at least one motor 94 can also function as a generator. The electrical powering system or the at least one motor 94 can include two or more electrical motors as described further herein.

Figure 11:
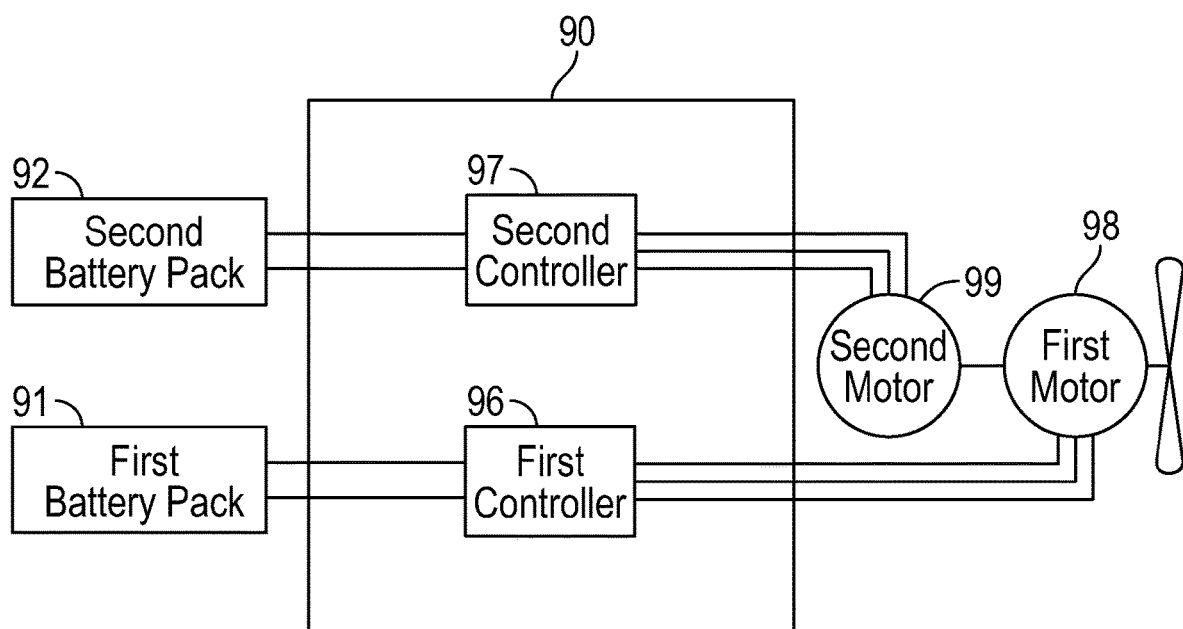
Figure 12:
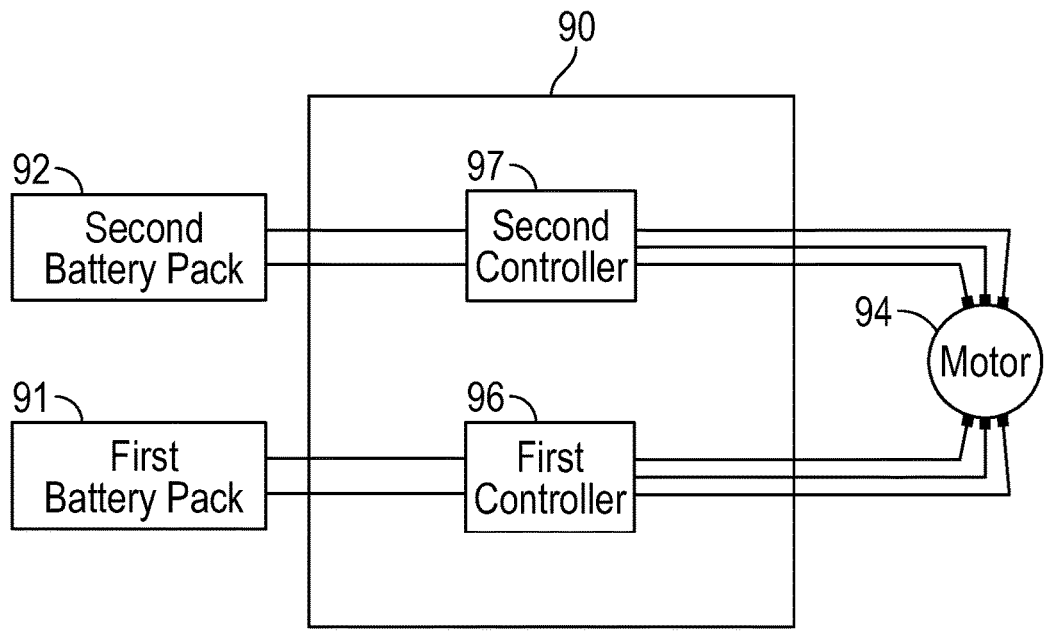
Figure 13:
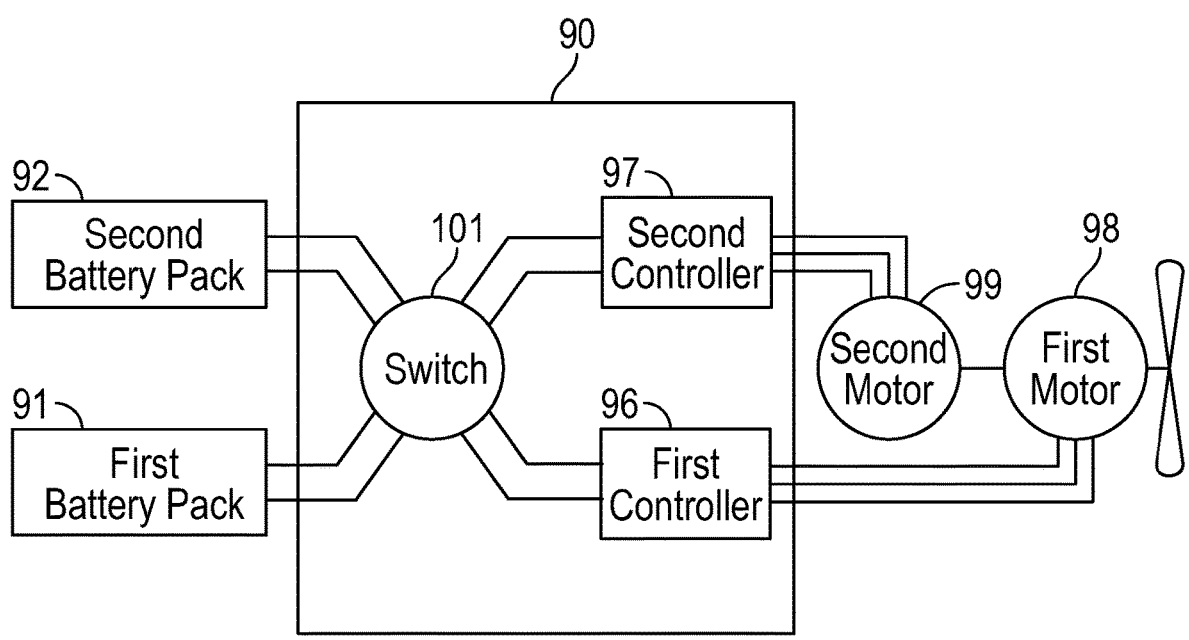

The different motors of the at least one motor 94 can have the same or different characteristics. The at least one motor 94 can be a motor with a first set of windings connected with a first controller 96 and with a second set of windings connected with a second controller 97, as shown for example in FIG. 12. This can allow use of the at least one motor 94 as generator and motor at the same time or to power the at least one motor 94 from the first controller 96 and the second controller 97. The at least one motor 94 can include a first motor 98 and a second motor 99 as shown for example in FIGS. 11 and 13. The first and the second motor 98 and 99 can be mechanically connected such that the rotors of the first and second motor 98 and 99 are mechanically coupled, for instance for powering both the same propeller or rotor (as shown in FIGS. 11 and 13). The first and the second motor 98 and 99 can, for example, drive the same axis which rotates the propeller or rotor. However, the first and second motor 98 and 99 may not be mechanically coupled and may drive two distinct propellers or rotors. The at least one motor 94 can include more than two motors M1, M2, ... Mi which are mutually connected, or multiple mutually connected motors.

The circuit 90 can be connected with the first battery pack 91, the second battery pack 92, and the at least one motor 94.

The circuit 90 can include a controller 93 connected with the first battery pack 91, the second battery pack 92, and the at least one motor 94. The controller 93 can, for example, be connected over a two phase or DC power line with the first battery pack 91 and the second battery pack 92 or connected over a three phase power line with the at least one motor 94. The controller 93 can transform, convert, or control the power received from the first battery pack 91 or the second battery pack 92 into motor driving signals for driving the at least one motor 94. The controller 93 can include a power converter for converting the DC current of the first battery pack 91 or the second battery pack 92 into a (three phase) (AC) current for the at least one motor 94 (power converter working as inverter). The power converter can treat different input DC voltages (if the first battery pack 91 and the second battery pack 92 have different DC voltages). If the at least one motor 94 acts as generator, the power converter can convert the current generated from each phase of the at least one motor 94 into a DC current for loading the first battery pack 91 or the second battery pack 92 (power converter working as rectifier). The controller 93 can create the motor driving signals for the at least one motor 94 based on user input.

Figure 10:
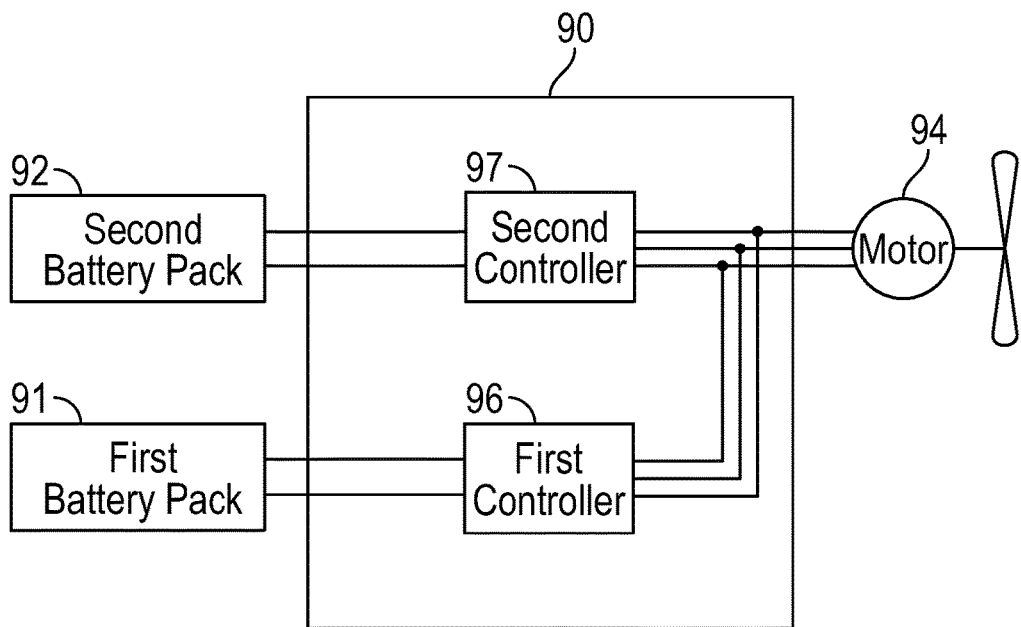

The controller 93 can include more than one controller. The controller 93 can include, for instance, a first controller 96 for powering the at least one motor 94 from at least one of the first battery pack 91 and the second battery pack 92 and a second controller 97 for powering the at least one motor 94 from at least one of the first battery pack 91 or the second battery pack 92. The features described for the controller 93 can apply to the first controller 96 or the second controller 97. Examples of such a circuit are shown in the FIGS. 10 to 13. In FIGS. 10 to 12, the first controller 96 powers the at least one motor 94 from the first battery pack 91 and the second controller 97 powers the at least one motor 94 from the second battery pack 92. The first controller 96 and the second controller 97 can power the at least one motor 94 as shown in FIG. 10 or the at least one motor 94 with different driving windings (or poles) as shown in FIG. 12.

As shown in FIGS. 11 and 13, the first controller 96 can drive a first motor 98 and the second controller 97 can drive a second motor 99. The first controller 96 and the second controller 97 can be flexible and drive the first motor 98 or the second motor 99 depending on a switching state of a switch 101 as shown in FIG. 13. The first controller 96 and the second controller 97 can be different. For example, the input DC voltage of the first controller 96 and the second controller 97 from the first battery pack 91 and the second battery pack 92 can be different. However, the first controller 96 and the second controller 97 can instead be identical.

The circuit 90 can select from at least two of the following connection modes. In a first connection mode, the first battery pack 91 can be electrically connected over the controller 93 with the at least one motor 94, while the second battery pack 92 may be electrically disconnected from the at least one motor 94. In the first connection mode, power can flow between the at least one motor 94 and the first battery pack 91, but may not flow between the at least one motor 94 and the second battery pack 92. In a second connection mode, the second battery pack 92 can be electrically connected over the controller 93 with the at least one motor 94, while the first battery pack 91 may be electrically disconnected from the at least one motor 94. In the second connection mode, power can flow between the at least one motor 94 and the second battery pack 92, but may not between the at least one motor 94 and the first battery pack 91. In a third connection mode, the first battery pack 91 and the second battery pack 92 can be electrically connected over the controller 93 with the at least one motor 94. In the third connection mode, power can flow between the at least one motor 94 and the first battery pack 91 and the second battery pack 92. Electrical switches can be used to perform this selection between different connection modes, and the electrical switches can be between the controller 93 and first battery pack 91 and the second battery pack 92, in the controller 93, or between the controller 93 and the at least one motor 94. If the at least one motor 94 has more than one motor, there can be further connection modes. The first battery pack 91 can be connected with the first motor 98 and not the second motor 99 (fourth connection mode) or with the second motor 99 and not the first motor 98 (fifth connection mode) or with the first motor 98 and the second motor 99 (sixth connection mode). The second battery pack 92 can be connected with the first motor 98 and not the second motor 99 (seventh connection mode) or with the second motor 99 and not the first motor 98 (eighth connection mode) or with the first motor 98 and the second motor 99 (ninth connection state). The first battery pack 91 and the second battery pack 92 can be connected with the first motor 98 and not the second motor 99 (tenth connection mode) or with the second motor 99 and not the first motor 98 (eleventh connection mode) or with the first motor 98 and the second motor 99 (twelfth connection state). The numbering of the connection modes can be arbitrarily chosen. If there may additionally be a third battery pack, there can be correspondingly more potential connection modes between the at least one motor and the three battery packs.

The circuit 90 can select from at least two of the following drive modes. In a first drive mode, the at least one motor 94 can be driven by the first battery pack 91 (without using the power of the second battery pack 92). In this first drive mode (which may be referred to as a standard drive mode), the circuit 90 can be in the first connection mode. Alternatively, in the first drive mode, the circuit 90 can also be in the third connection mode, while no power flows from the second battery pack 92 to the at least one motor 94. This standard drive mode can be used when the power consumption of the least one motor 94 may be low, such as during steady flight conditions, gliding flight, or landing of an aircraft. In a second drive mode (which may be referred to as a high energy drive mode), the at least one motor 94 can be driven by the second battery pack 92 (without using the power of the first battery pack 91). In this second drive mode, the circuit 90 can be in the second connection mode. Alternatively, in the second drive mode, the circuit 90 can also be in the third motor connection mode, while no power flows from the first battery pack 91 to the at least one motor 94. This second drive mode can be used when the power consumption of the at least one motor 94 may be high, such as during maneuvering, climb flight, or take off. In a third drive mode (which may be referred to as a very high energy drive mode), the at least one motor 94 can be simultaneously driven by the first battery pack 91 and the second battery pack 92. In this third drive mode, the circuit 90 can be in the third connection mode. This third drive mode can be used when the power consumption of the least one motor 94 may be high, such as during maneuvering, climb flight, or take off.

The circuit 90 can include a detector for detecting the power requirements of a present flight mode. The detection can be performed from user input or sensor measurements, such as by measuring the current in the motor input line. The circuit 90 can select the drive mode or the connection mode based at least on the detection result of this detector.

The selection between connection modes can depend at least on the charging level of the different battery packs. For example, a high-power battery pack can be used instead, or in addition to, a high energy-density battery pack when the charge of the high energy-density battery pack is low.

The electrical powering systems of FIGS. 8 to 13 can be configured such that the second battery pack 92 can be charged from the first battery pack 91, such as via the circuit 90. Moreover, the electrical powering systems can be configured such that the second battery pack 92 can be charged from the first battery pack 91 while the first battery pack 91 powers or drives the at least one motor 94.

Figure 9:
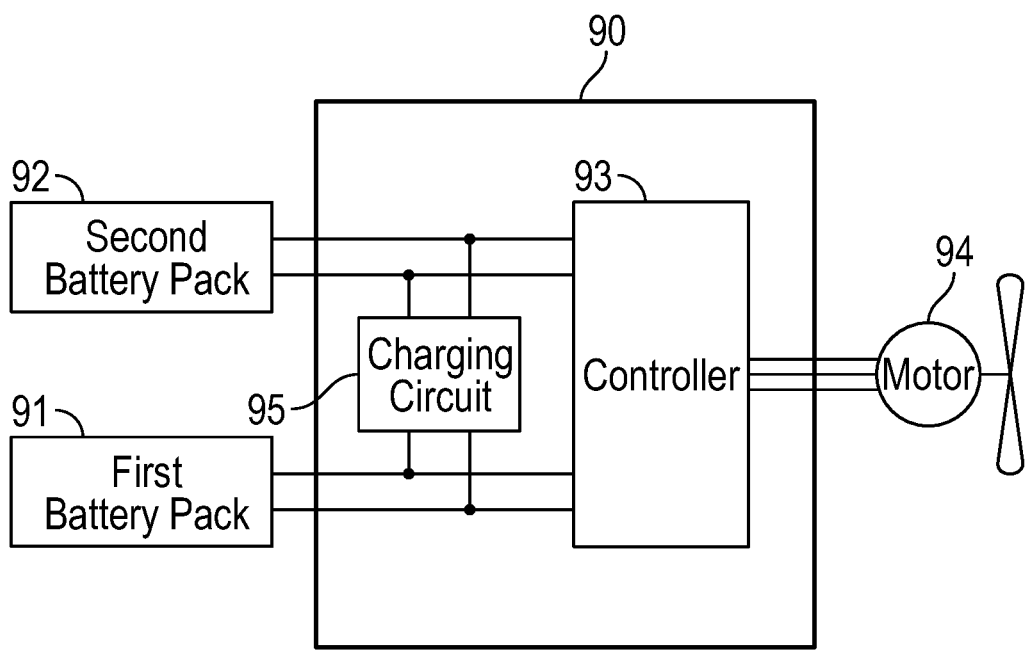

In FIGS. 9 to 11, the circuit 90 can electrically connect the first battery pack 91 and the second battery pack 92 for charging. The connection can be steady or realized by a switch which switches between a first battery connection mode in which the first battery pack 91 and the second battery pack 92 are electrically connected and a second battery connection mode in which the first battery pack 91 and the second battery pack 92 are electrically disconnected. As explained further herein, the first battery connection mode can be realized by connecting the first battery pack 91 and the second battery pack 92 over a charging circuit 95 or over the controller 93 or over one or more other controllers.

In FIG. 9, the circuit 90 the charging circuit 95 for charging the second battery pack 92 from the first battery pack 91. The charging circuit 95 can control energy flow from the first battery pack 91 to the second battery pack 92 and may transfer the energy without transferring the energy through the controller 93. The charging circuit 95 can include a switch (not shown) for connecting the first battery pack 91 with the second battery pack 92 for charging. Such a switch may have the advantage that the charging process can be controlled by a user or by a microprocessor. For example, if the full power of the first battery pack 91 is desired to power the at least one motor 94, the process of charging the second battery pack 92 may automatically be interrupted. However, the charging circuit 95 can instead work switchless so that the process of charging automatically starts when a certain electrical parameter, like the voltage or capacitance of the second battery pack 92, falls below a certain threshold.

If the voltage of the first battery pack 91 and the second battery pack 92 may be different, the charging circuit 95 can include a DC/DC converter for converting the DC voltage of the first battery pack 91 into the DC voltage of the second battery pack 92. The second battery pack 92 can be charged from the first battery pack 91 at the same time that the at least one motor 94 is driven by the first battery pack 91 or at a time that the at least one motor 94 is not powered, such as by the first battery pack 91.

In FIG. 10, the second battery pack 92 can be charged over the first controller 96 and the second controller 97. The first battery pack 91 can provide energy and power for the first controller 96, which can convert this energy and power into the electrical driving signals for the at least one motor 94. For charging the second battery pack 92, the electrical driving signals from the first controller 96 can be converted by the second controller 97 into the charging signal (DC voltage) for the second battery pack 92. The electrical driving signals for the at least one motor 94 from the first controller 96 can be used for charging the second battery pack 92 and for driving the at least one motor 94 at the same time. This can allow the second battery pack 92 to charge from the first battery pack 91 at the same time that the at least one motor 94 may be driven by the electrical driving signals from the first controller 96. The second battery pack 92 can however instead be charged by the electrical drive signals without powering the motor at the same time.

Instead of or in addition to electrically connecting the first battery pack 91 with the second battery pack 92 for transferring electrical energy from the first battery pack 91 to the second battery pack 92, the first battery pack 91 can be mechanically connected with the second battery pack 92 for transferring mechanical energy to charge the second battery pack 92 from the first battery pack 91.

In FIG. 11, mechanical charging can be realized by driving the first motor 98 from the first battery pack 91 (over the first controller 96) and generating energy from the second motor 99 which is mechanically connected to the first motor 98 and working as generator. The energy generated by the second motor 99 can be used to charge the second battery pack 92 (by converting the generated motor signals of the second motor 99 via the second controller 97 into the charging signal (DC voltage) of the second battery pack 92). This can allow the second battery pack 92 to charge from the first battery pack 91 at the same time that the at least one motor 94 is driven by the energy from the first battery pack 91.

In FIG. 12, mechanical charging can be realized by driving the at least one motor 94 from the first battery pack 91 (such as over the first controller 96) with the first set of windings of the at least one motor 94 and generating energy from the at least one motor 94 over the second set of windings of the at least one motor 94 which can function as a generator. The energy generated by the second set of windings can be used to charge the second battery pack 92 by converting the generated motor signals of the at least one motor 94 via the second controller 97 into the charging signal (DC voltage) of the second battery pack 92. This can allow the second battery pack 92 to charge from the first battery pack 91 at the same time that the at least one motor 94 is driven by the energy from the first battery pack 91. Moreover, this can enable the second battery pack 92 to charge from the first battery pack 91 without utilizing separate circuitry, such as a DC/DC converter, which would increase a weight of the aircraft.

FIG. 13 shows a switch 101 which can select from different battery packs or connection modes as described herein. This can allow the first battery pack 91 to connect with the second battery pack 92 (first battery connection mode) to charge the second battery pack 92 directly from the first battery pack 91. This can allow the first battery pack 91 to connect with (i) one of the first controller 96 or the second controller 97, (ii) one of the first motor 98 or second motor 99 and the second battery pack 92 with the other of the first controller 96 or the second controller 97, or (iii) the first motor 98 and the second motor 99 to charge the second battery pack 92 mechanically. This can allow for selection of the first motor 98 or the second motor 99 to be driven by the first battery pack 91 or the second battery pack 92.

The design of FIG. 13 can give the flexibility to choose among electrical charging or mechanical charging.

The second battery pack 92 can be charged by the at least one motor 94 which can work as a generator. When the at least one motor 94 may work as a generator, the generation can be driven by braking energy, such as during descent or landing of the aircraft. The second battery pack 92 can as a result recover energy without affecting the functioning of the first battery pack 91 for long distances. When the at least one motor 94 may work as a generator, the generation can be driven from the first battery pack 91 to charge the second battery pack 92. The second battery pack 92 can be charged by the at least one motor 94 working as a generator while the same motor or another motor of the at least one motor 94 can be driven by the energy from the first battery pack 91, such as for instance described with respect to FIGS. 11, 12, and 13.

The electrical powering system can include a third battery pack (not shown). The second battery pack 92 and the third battery pack can have different electrical characteristics. The second battery pack 92 can, for instance, have a higher energy capacity than the third battery pack. The second battery pack 92 can have a higher energy density than the third battery pack. The second battery pack 92 can have a lower maximum, nominal, or peak power than the third battery pack. The second battery pack 92 can have a lower maximum, nominal, or peak current than the third battery pack. The second battery pack 92 can have a lower maximum, nominal, or peak voltage than the third battery pack. The type or the material composition of the battery cells of the second battery pack 92 and the third battery pack can be different or the same. The third battery pack can include a supercapacitor. The third battery pack can increase a maximum power that may be delivered or recovered by the electrical powering system. The power recovered by the at least one motor 94 acting as a generator from a braking action can, for example, immediately be recovered in the third battery pack up to a high recover power level. The third battery pack can be charged from the first battery pack 91 or the second battery pack 92, such as even while the at least one motor 94 may be driven from the power of the first battery pack 91 or the second battery pack 92.

Modular Battery System

The power sources in an electric or hybrid aircraft can be modular and distributed to optimize a weight distribution or select a center of gravity for the electric or hybrid aircraft, as well as maximize a use of space in the aircraft. Moreover, the batteries in an electric or hybrid aircraft can desirably be designed to be positioned in place of a combustion engine so that the aircraft can retain a similar shape or structure to a traditional combustion powered aircraft and yet may be powered by batteries. In such designs, the weight of the batteries can be distributed to match that of a combustion engine to enable the electric or hybrid aircraft to fly similarly to the traditional combustion powered aircraft.

Figure 14A:
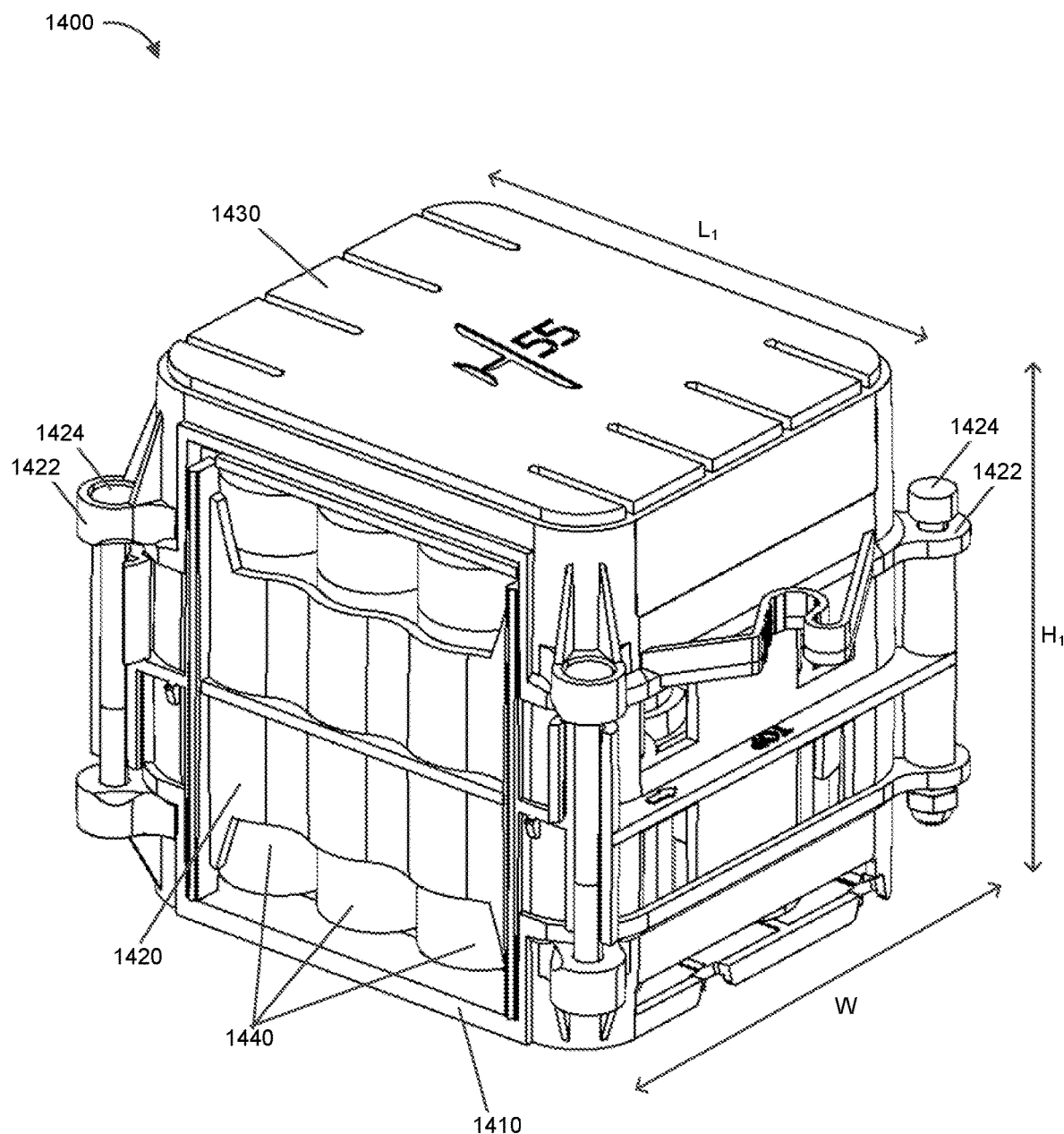
FIGS. 14A and 14B illustrate a battery module usable in an aircraft.

FIG. 14A illustrates a battery module 1400 usable in an aircraft, such as the aircraft 100 of FIGS. 1A and 1B. The battery module 1400 can include a lower battery module housing 1410, a middle battery module housing 1420, an upper battery module housing 1430, and a multiple battery cells 1440. The multiple battery cells 1440 can together provide output power for the battery module 1400. The lower battery module housing 1410, the middle battery module housing 1420, or the upper battery module housing 1430 can include slots, such as slots 1422, that are usable to mechanically couple the lower battery module housing 1410, the middle battery module housing 1420, or the upper battery module housing 1430 to one another or to another battery module. Supports, such as supports 1424 (for example, pins or locks), can be placed in the slots to lock the lower battery module housing 1410, the middle battery module housing 1420, or the upper battery module housing 1430 to one another or to another battery module.

The battery module 1400 can be constructed so that the battery module 1400 is evenly cooled by air. The multiple battery cells 1440 can include 16 total battery cells where the battery cells are each substantially shaped as a cylinder. The lower battery module housing 1410, the middle battery module housing 1420, or the upper battery module housing 1430 can be formed of or include plastic and, when coupled together, have an outer shape substantially shaped as a rectangular prism. The lower battery module housing 1410, the middle battery module housing 1420, or the upper battery module housing 1430 can together be designed to prevent a fire in the multiple battery cells 1440 from spreading outside of the battery module 1400.

The battery module 1400 can have a length of L1, a width of W, and a height of H1. The length of L1, the width of W, or the height of H1 can each be 50 mm, 65 mm, 80 mm, 100 mm, 120 mm, 150 mm, 200 mm, 250 mm or within a range defined by two of the foregoing values or another value greater or less than the foregoing values.

Figure 14B:
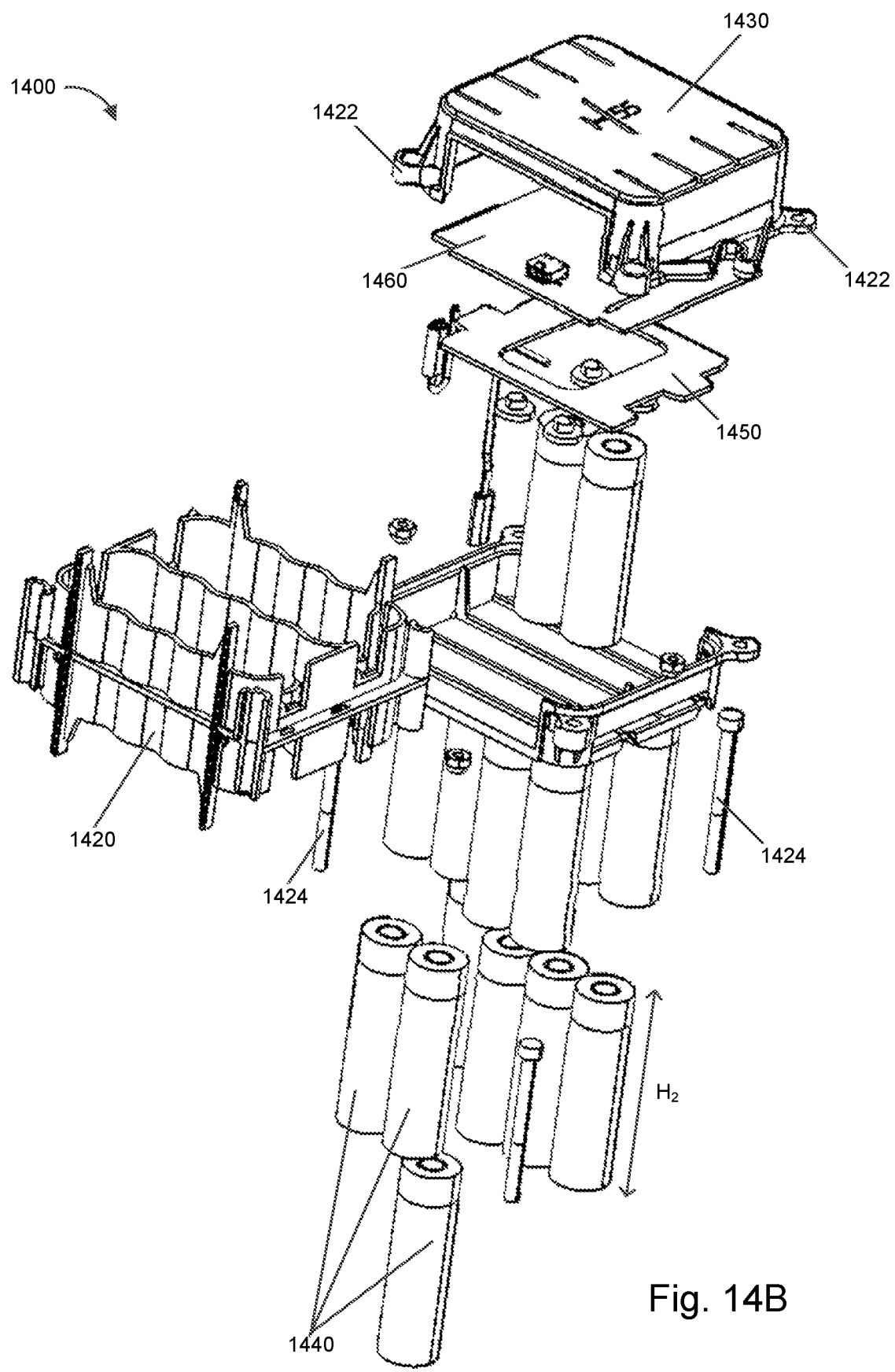

FIG. 14B illustrates an exploded view of the battery module 1400 of FIG. 14A. In the exploded view, a plate 1450 and a circuit board assembly 1460 of the battery module 1400 is shown. The plate 1450 can be copper and may electrically connect the multiple battery cells 1440 in parallel with one another. The plate 1450 may also distribute heat evenly across the multiple battery cells 1440 so that the multiple battery cells 1440 age at the same rate. The circuit board assembly 1460 may transfer power from or to the multiple battery cells 1440, as well as include one or more sensors for monitoring a voltage or a temperature of one or more battery cells of the multiple battery cells 1440. The circuit board assembly 1460 may or may not provide galvanic isolation to the battery module 1400 with respect to any components that may be electrically connected to the battery module 1400. Each of the multiple battery cells 1440 can have a height of H2, such as 30 mm, 50 mm, 65 mm, 80 mm, 100 mm, 120 mm, 150 mm or within a range defined by two of the foregoing values or another value greater or less than the foregoing values.

Figure 15A:
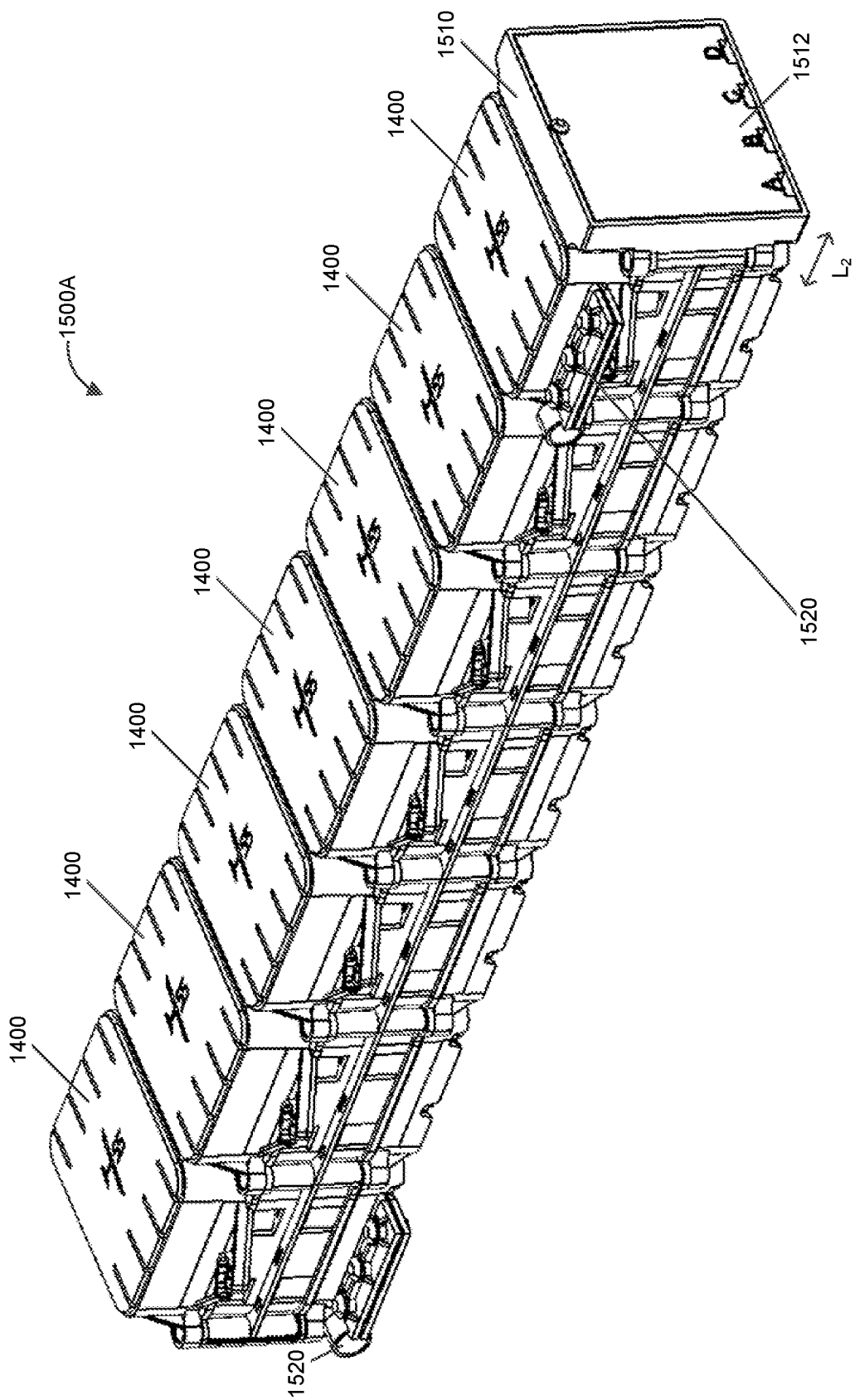
FIGS. 15A and 15B illustrate a power source formed of multiple battery modules.

FIG. 15A illustrate a power source 1500A formed of multiple battery modules 1400 of FIGS. 14A and 14B. The multiple battery modules 1400 of the power source 1500A can be mechanically coupled to one another. A first side of one battery module 1400 can be mechanically coupled to a first side of another battery module 1400, and a second side of the one battery module 1400 that is opposite the first side can be mechanically coupled to a first side of yet another battery module 1400. The multiple battery modules 1400 of the power source 1500A can be electrically connected in series with one another. As illustrated in FIG. 15A, the power source 1500A can include seven of the battery modules 1400 connected to one another. The power source 1500A may, for example, have a maximum power output between 1 kW and 60 kW during operation, a maximum voltage output between 10 V and 120 V during operation, or a maximum current output between 100 A and 500 A during operation.

The power source 1500A can include a power source housing 1510 mechanically coupled to at least one of the battery modules. The power source housing 1510 can include an end cover 1512 that covers a side of the power source housing 1510. The power source housing 1510 can have a length of L2, such as 3 mm, 5 mm, 10 mm, 15 mm, 20 mm, 25 mm, 30 mm, 40 mm, 50 mm or within a range defined by two of the foregoing values or another value greater or less than the foregoing values. The width and the height of the power source housing 1510 can match the length of L1 and the width of W of the battery module 1400.

The power source 1500A can include power source connectors 1520. The power source connectors 1520 can be used to electrically connect the power source 1500A to another power source, such as another of the power source 1500A.

Figure 15B:
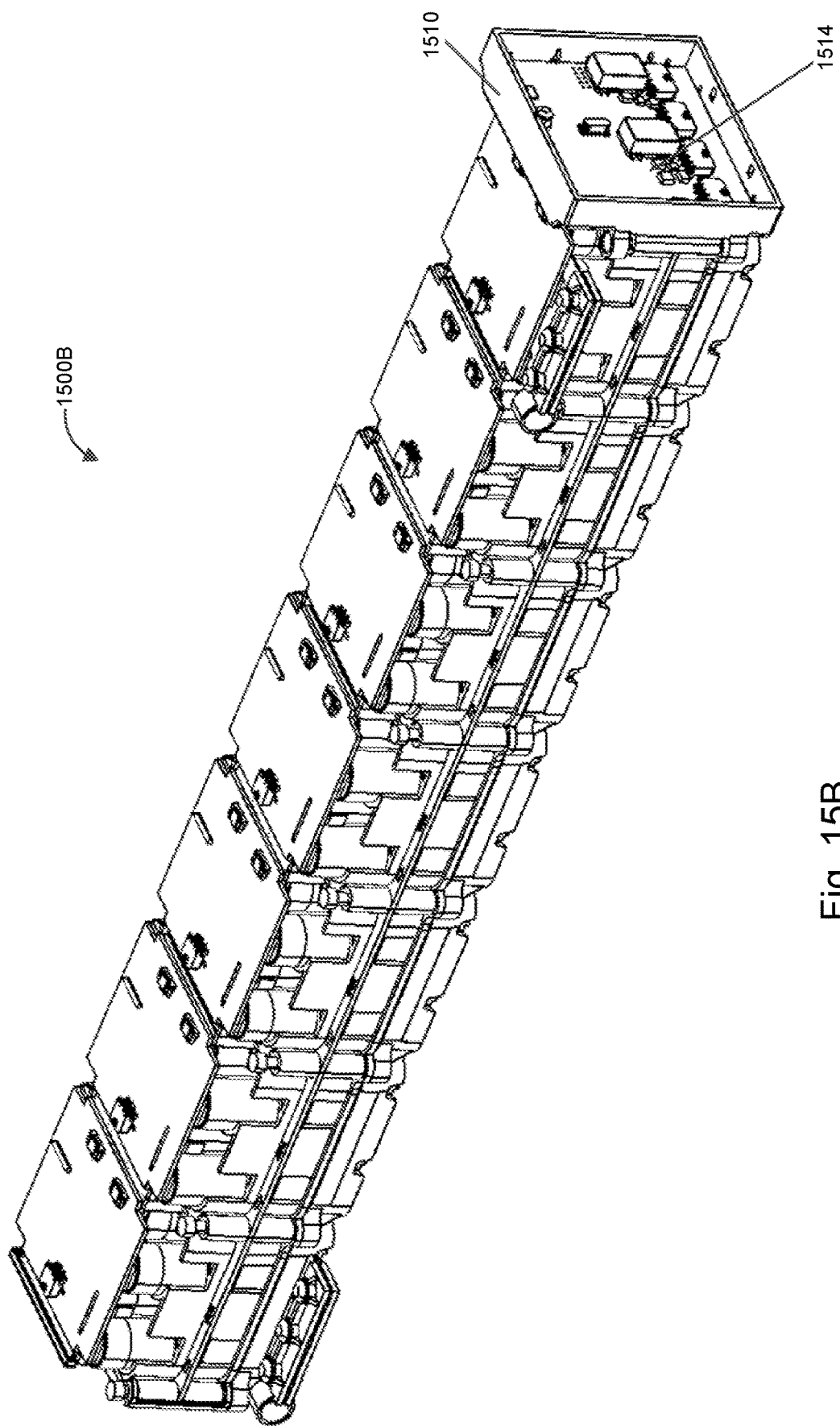

FIG. 15B illustrates a power source 1500B that is similar to the power source 1500A of FIG. 15A but with the end cover 1512 and the upper battery module housings 1430 of the battery modules 1400 removed. Because the end cover 1512 has been removed, a circuit board assembly 1514 of the power source 1500B is now exposed. The circuit board assembly 1514 can be electrically coupled to the battery modules 1400. The circuit board assembly 1514 can additionally provide galvanic isolation (for instance, 2500 Vrms) for the power source 1500B with respect to any components that may be electrically connected to the power source 1500B. The inclusion of galvanic isolation in this manner may, for instance, enable grouping of the battery modules 1400 together so that isolation may be provided to the grouping of the battery modules 1400 rather than individual modules of the battery modules 1400 or a subset of the battery modules 1400. Such an approach may reduce the costs of construction because isolation can be expensive, and a single isolation may be used for multiple of the battery modules 1400.

Figure 16:
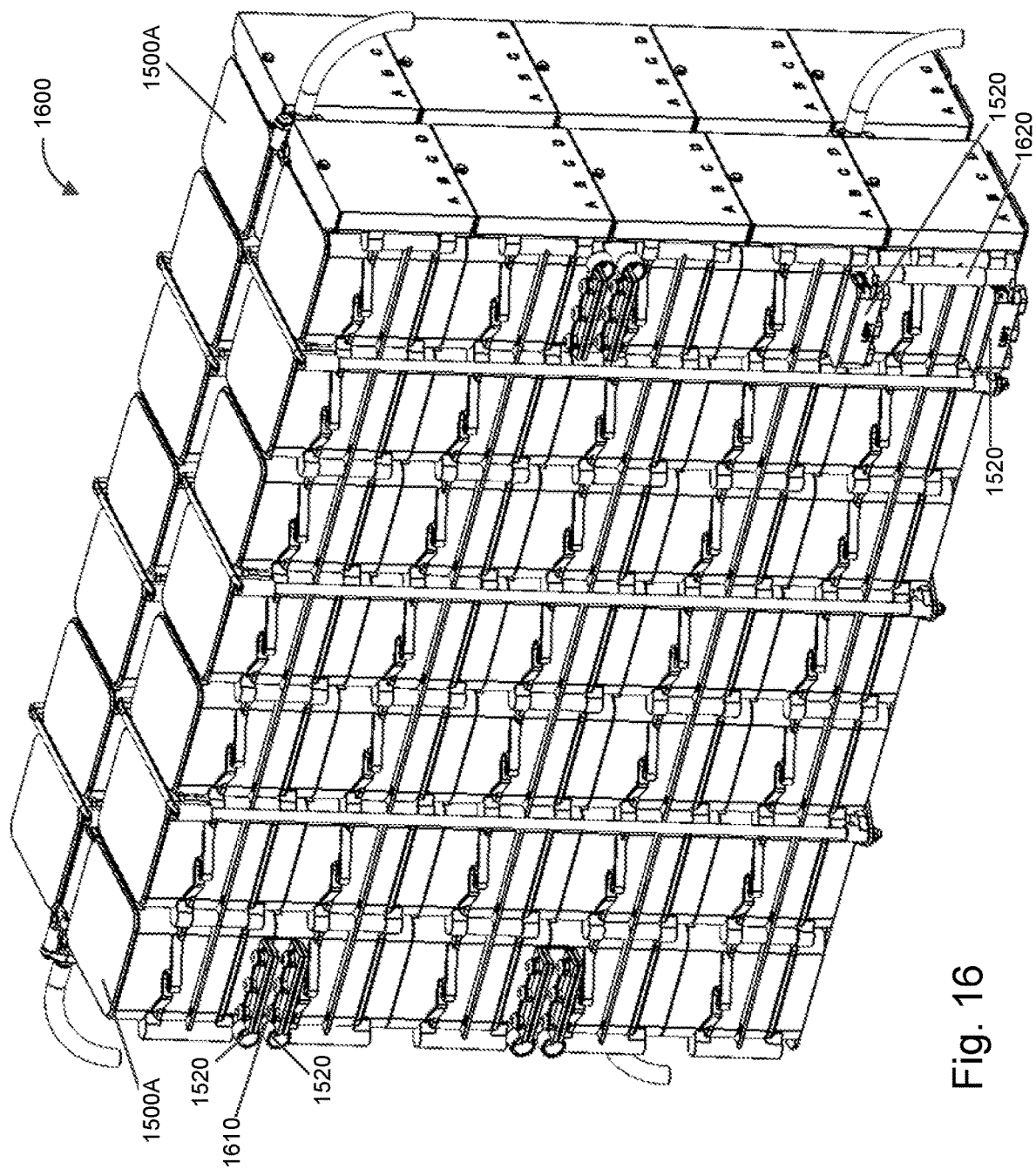
FIG. 16 illustrates multiple power sources arranged and connected for powering an aircraft.

FIG. 16 illustrates a group 1600 of multiple power sources 1500A of FIG. 15A arranged and connected for powering an aircraft, such as the aircraft 100 of FIGS. 1A and 1B. The multiple power sources 1500A of the group 1600 can be mechanically coupled to or stacked on one another. The multiple power sources 1500A of the group 1600 can be electrically connected in series or parallel with one another, such as by a first connector 1610 or a second connector 1620 that electrically connects the power source connectors 1520 of two of the multiple power sources 1500A. As illustrated in FIG. 16, the group 1600 can include 10 power sources (for instance, arranged in a 5 row by 2 column configuration). In other examples, a group may include a fewer or greater number of power sources, such as 2, 3, 5, 7, 8, 12, 15, 17, 20, 25, 30, 35 or 40 power sources.

The grouping of the multiple power sources 1500A to form the group 1600 or another different group may allow for flexible configurations of the multiple power sources 1500A to satisfy various space or power requirements. Moreover, the grouping of the multiple power sources 1500A to form the group 1600 or another different group may permit relatively easy or inexpensive replacement of one or more of the multiple power sources 1500A in the event of a failure or other issue.

Figure 17A:
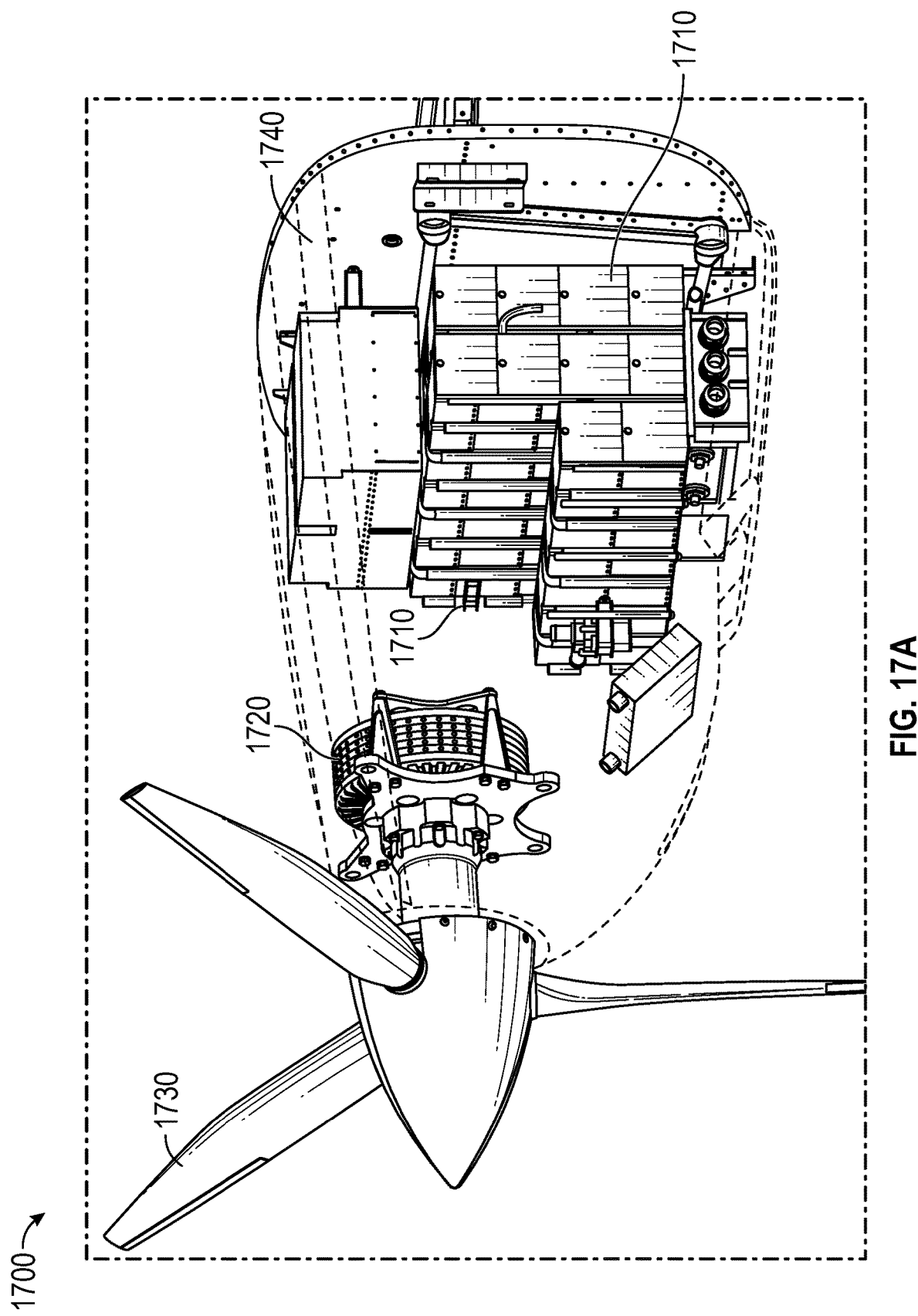
FIGS. 17A and 17B illustrate multiple power sources positioned in a nose of an aircraft for powering the aircraft.

FIG. 17A illustrates a perspective view of a nose 1700 of an aircraft, such as the aircraft 100 of FIGS. 1A and 1B, that includes multiple power sources 1710, such as multiple of the power source 1500A, for powering a motor 1720 that operates a propeller 1730 of the aircraft. The multiple power sources 1710 can be used to additionally or alternatively power other components of the aircraft. The multiple power sources 1710 can be sized and arranged to optimize a weight distribution and use of space around the nose 1700. The motor 1720 and the propeller 1730 can be attached to and supported by a frame of the aircraft by supports, which can be steel tubes, and connected by multiple fasteners, which be bolts with rubber shock absorbers. A firewall 1740 can provide barrier between the multiple power sources 1710 and the frame of the aircraft in the event of a first at the multiple power sources 1710. An enclosure composed of glass fiber, metal, or mineral composite can be around the multiple power sources 1710 to protect from water, coolant, or fire.

Figure 17B:
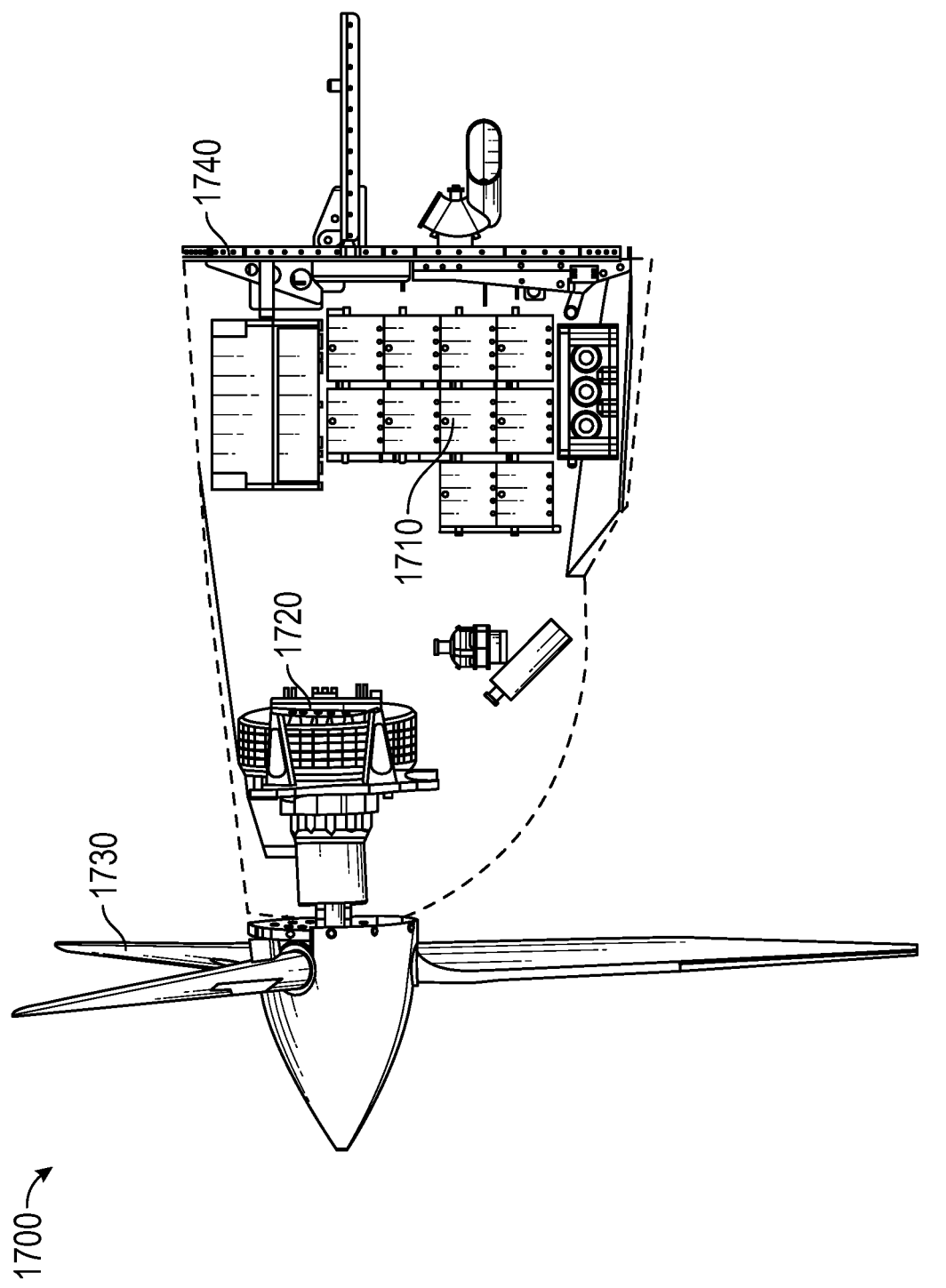

FIG. 17B illustrates a side view of the nose 1700 of FIG. 17A.

Figure 18A:
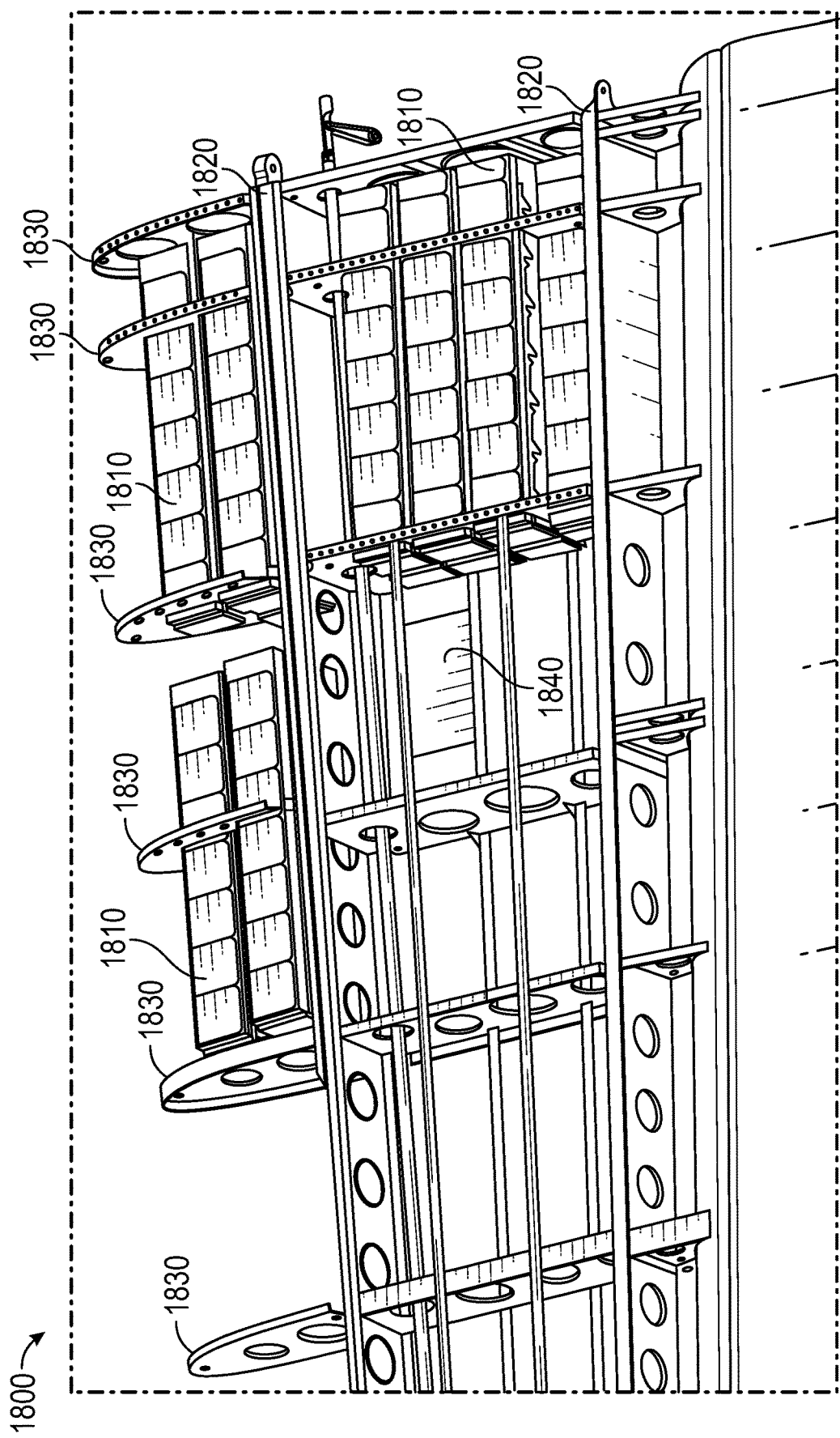
FIGS. 18A and 18B illustrate multiple power sources positioned in a wing of an aircraft for powering the aircraft.

FIG. 18A illustrates a top view of a wing 1800 of an aircraft that includes multiple power sources 1810, such as multiple of the power source 1500A, for powering one or more components of the aircraft. The multiple power sources 1810 can be sized and arranged to optimize a weight distribution and use of space around the wing 1800. For example, the multiple power sources 1810 can be positioned within, between, or around horizontal support beams 1820 or vertical support beams 1830 of the wing 1800. A relay 1840 can further be positioned in the wing 1800 as illustrated and housed in a sealed enclosure. The relay 1840 may open if there is not a threshold voltage on a breaker panel or if a pilot opens breakers to shut down the multiple power sources 1810.

Figure 18B:
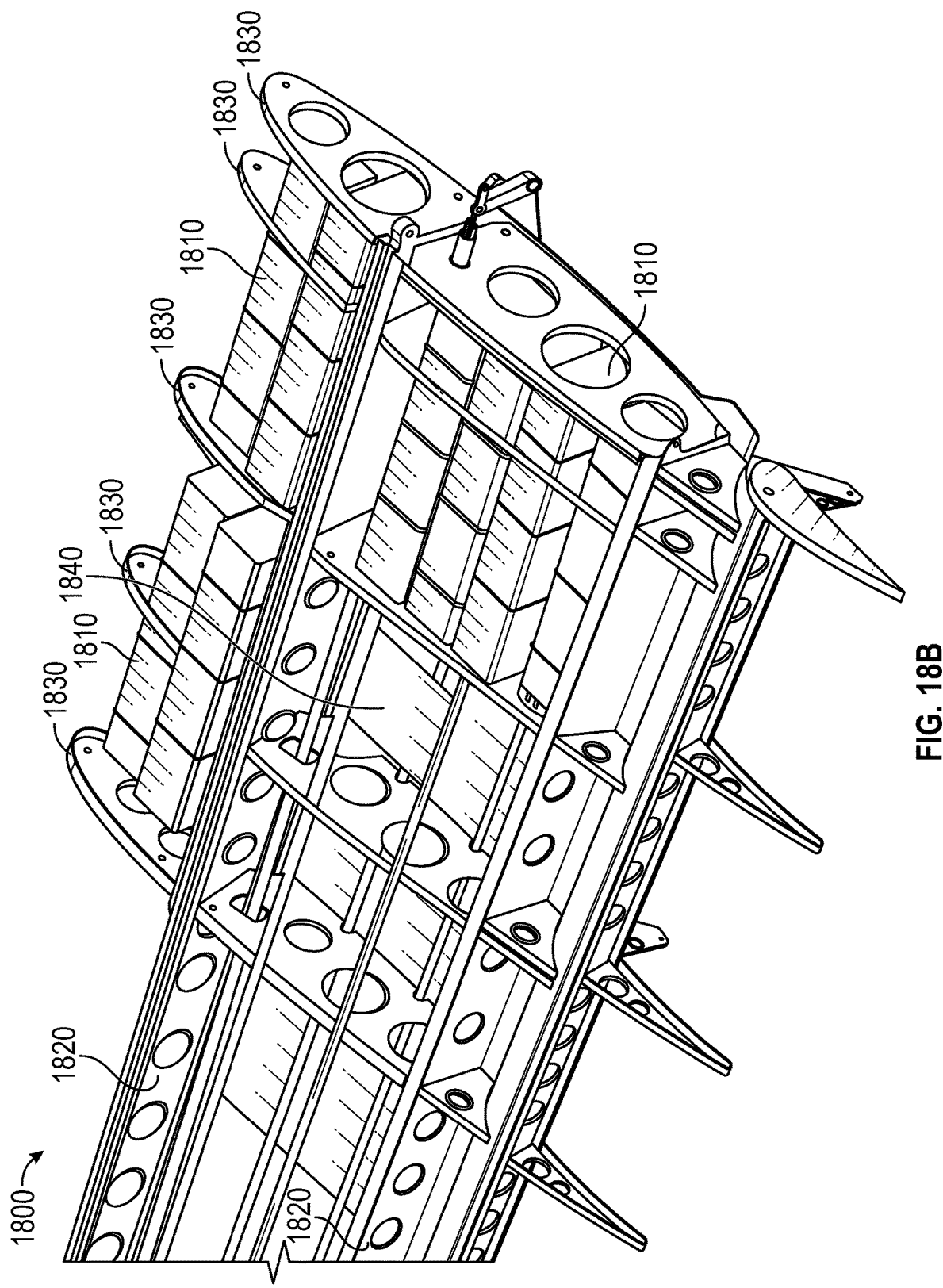

FIG. 18B illustrates a perspective view of the wing 1800 of FIG. 18A.

Multi-Coil Motor Control

An electric or hybrid aircraft can be powered by a multi-coil motor, such as an electric motor, in which different coils of the motor power different phases of a modulation cycle for the motor.

Figure 19:
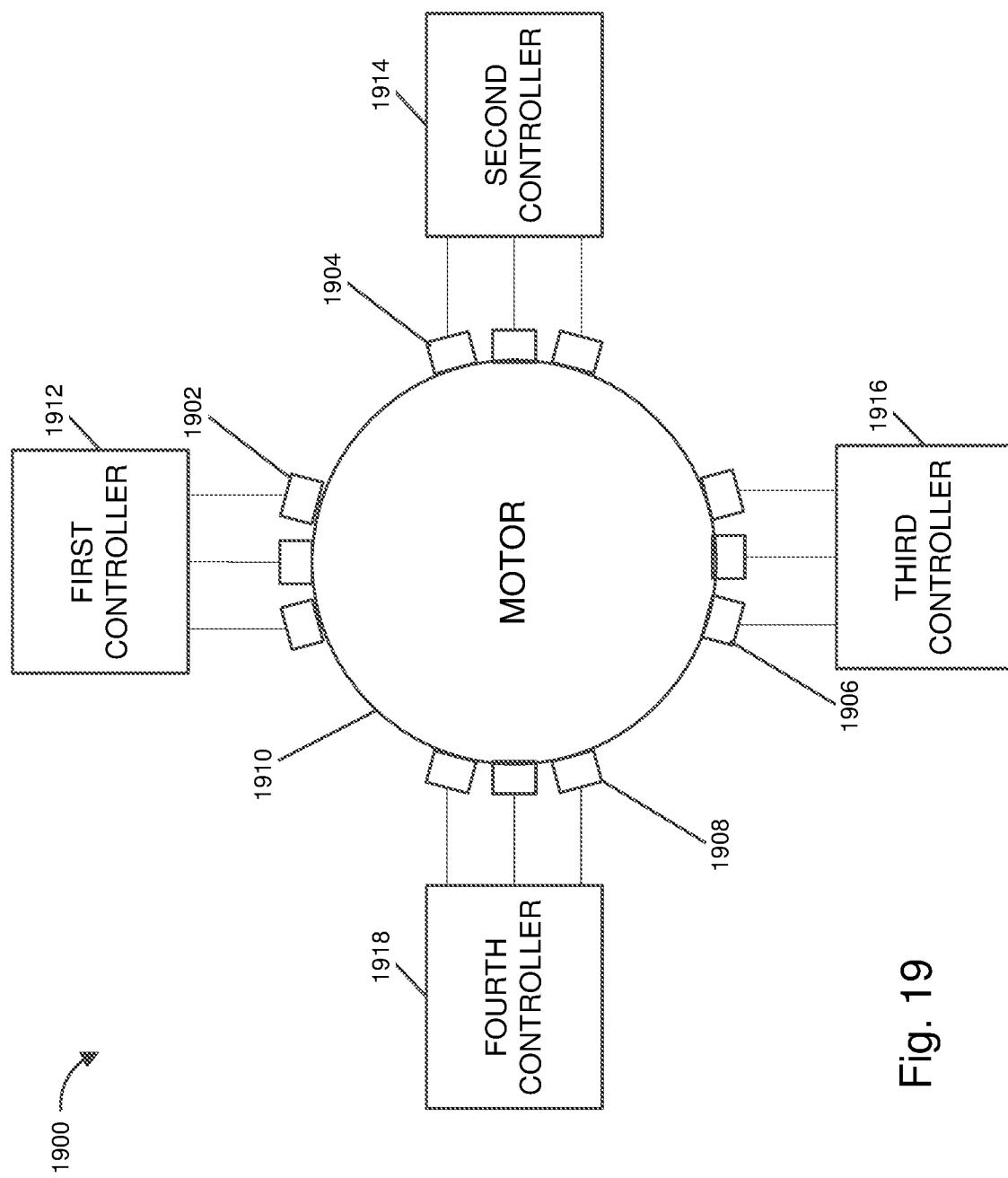
FIG. 19 illustrates a motor with multiple field coils.

As can be seen from FIG. 19, a motor 1910 can include four different field coils (sometimes also referred to as coils) for generating a torque on a rotor of the motor 1910. The different field coils can include a first field coil 1902, a second field coil 1904, a third field coil 1906, and a fourth field coil 1908. Each of the different field coils can be independently powered by one or more controllers. The first field coil 1902, the second field coil 1904, the third field coil 1906, and the fourth field coil 1908 can be respectively powered by a first controller 1912, a second controller 1914, a third controller 1916, and a fourth controller 1918. One or more of the first controller 1912, the second controller 1914, the third controller 1916, and the fourth controller 1918 may be the same controller.

The first controller 1912, the second controller 1914, the third controller 1916, and the fourth controller 1918 can vary a current provided to individual coils of the first field coil 1902, the second field coil 1904, the third field coil 1906, and the fourth field coil 1908 to compensate for a failure of one or more (such as, one, two, or three) of the field coils. The first controller 1912, the second controller 1914, the third controller 1916, and the fourth controller 1918 may, for example, no longer provide current to a coil that has failed and provide additional current to one or more coils that have not yet failed. The first controller 1912, the second controller 1914, the third controller 1916, and the fourth controller 1918 can attempt to maintain a power output of the motor (for example, above a threshold) despite the failure of the one or more of the field coils.

The first controller 1912, the second controller 1914, the third controller 1916, or the fourth controller 1918 can determine the failure of one or more of the field coils from one or more sensors monitoring the motor or one or more individual field coils, such as proximate to the motor or one or more individual field coils. The one or more sensors can include a temperature sensor, a current sensor, or a magnetic field sensor, among other types of sensors. For example, where the one or more sensors includes at least one temperature sensor, the first controller 1912, the second controller 1914, the third controller 1916, or the fourth controller 1918 can determine the failure of one or more of the field coils from a change in the temperature sensed by the temperature sensor (for instance, a temperature drop over time or proximate different field coils may correspond to a failure of a particular field coil or a number of field coils in the motor 1910). The first controller 1912, the second controller 1914, the third controller 1916, or the fourth controller 1918 may moreover attempt to operate the motor so that the temperature sensed remains constant within a tolerance. As another example, where the one or more sensors includes at least one voltage sensor, the first controller 1912, the second controller 1914, the third controller 1916, or the fourth controller 1918 can determine the failure of one or more of the field coils from a change in the voltage sensed by the voltage sensor (for instance, a voltage spike may correspond to a failure of a particular field coil or a number of field coils in the motor 1910). As yet another example, where the one or more sensors includes at least one magnetic field sensor, the first controller 1912, the second controller 1914, the third controller 1916, or the fourth controller 1918 can determine the failure of one or more of the field coils from a change in the resonance sensed by the magnetic field sensor.

Figure 20:
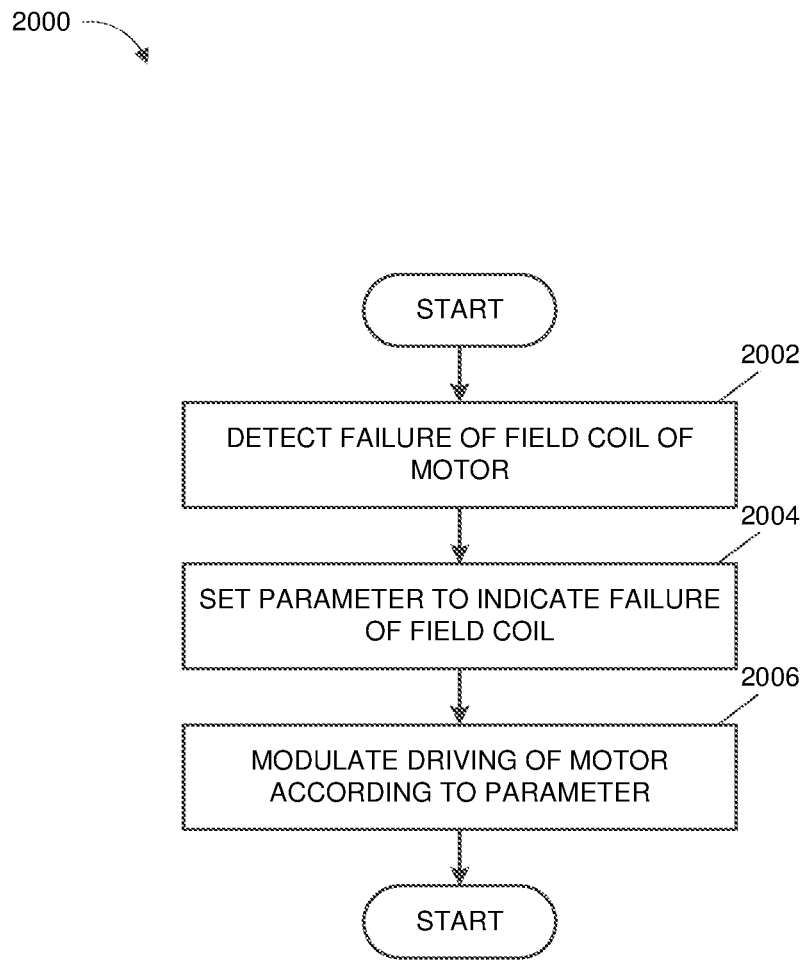
FIG. 20 illustrates a process for operating a motor to compensate for failure of a field coil of the motor.

FIG. 20 illustrates a process 2000 for operating a motor, such as the motor 1900, to compensate for the failure of a field coil of the motor. For convenience, the process 2000 is described as being performed by the first controller 1912, the second controller 1914, the third controller 1916, or the fourth controller 1918 of FIG. 19. However, the process 2000 may additionally or alternatively be performed by another processor or electronic circuitry, such as is described herein. The process 2000 can advantageously enable a quick reaction (for instance, within a few seconds or even faster) to failure of one or more failed field coils so that the operation of the motor may be quickly adjusted to maintain a power output of the motor despite the failure of the one or more field coils.

At block 2002, a failure of a field coil of a motor can be detected. For example, the first controller 1912, the second controller 1914, the third controller 1916, or the fourth controller 1918 can detect failure of one or more of the first field coil 1902, the second field coil 1904, the third field coil 1906, or the fourth field coil 1908 from a change in electrical coil characteristics, a change in how the field coil may be driven, a feedback from the motor 1900 about its operations, a change in performance of the motor 1900, or an output from a sensor.

At block 2004, a parameter can be set to indicate the failure of the field coil. For instance, the first controller 1912, the second controller 1914, the third controller 1916, or the fourth controller 1918 can set a parameter in a memory device indicative of the failure of the field coil.

At block 2006, a driving of the motor can be modulated according to the parameter. For example, the first controller 1912, the second controller 1914, the third controller 1916, or the fourth controller 1918 can adjust how the field coil that has failed is driven based on a stored indication that the field coil has failed. The first controller 1912, the second controller 1914, the third controller 1916, or the fourth controller 1918 may modulate a power input to the motor over time to compensate for the failure of the field coil and, during a modulation cycle for the motor, to increase the power input to one or more functioning field coils to compensate for the failure.

The first controller 1912, the second controller 1914, the third controller 1916, or the fourth controller 1918 can, prior to a failure of a field coil, provide the electrical current one time to all of the first field coil 1902, the second field coil 1904, the third field coil 1906, and the fourth field coil 1908 in an order prior to providing the electrical current another time to any of the first field coil 1902, the second field coil 1904, the third field coil 1906, and the fourth field coil 1908. Subsequent to the failure of the field coil, the first controller 1912, the second controller 1914, the third controller 1916, or the fourth controller 1918 may no longer provide electrical current to the field coil that has failed and can increase a current provided to one or more other field coils (such as to a field coil before the failed field coil and after the failed field coil in the order) to compensate for the failure of the field coil.

Additionally or alternatively, the electric or hybrid aircraft can vary a rotation rate (for instance, revolutions per minute) of the motor or a pitch of a propeller of the aircraft (for instance, increase the pitch to increase the power output) to compensate for a failure of one or more (such as, one, two, or three) of the field coils, as well as attempt to maintain a power output of the motor despite the failure of the one or more of the field coils.

Moreover, the process 2000 can be adjusted so that the driving of the motor may be modulated responsive to the detection of the failure of the field coil and without the storing or referencing of the parameter.

Example Implementations

A battery monitoring system is disclosed for monitoring and transmitting parameters relating to the state of a battery pack to a driver or pilot of an electric vehicle. The battery monitoring system can include a first battery monitoring circuit and a second redundant battery monitoring circuit. The first battery monitoring circuit can include multiple battery management systems (BMSs). Each BMS can manage and monitor a different subset of battery cells in the battery pack. The first battery monitoring circuit can include a digital communication bus to provide first warning signals to a driver or pilot of the vehicle in case of dysfunction of the battery pack. The second battery monitoring circuit can redundantly monitor the battery pack to provide at least one second warning signal to the driver or pilot of the vehicle in case of dysfunction of the battery pack. The second battery monitoring circuit may include only analog or combinational logic electronic components.

The battery monitoring system of the preceding paragraph can include one or more of the following features: The second battery monitoring circuit can be a processorless circuit. The second battery monitoring circuit may include only analog or combinational logic electronic components. The second battery monitoring circuit may transmit only analog or binary signals. The second battery monitoring circuit can transmit signals for the driver or pilot via communications lines different from the digital communication bus. The second battery monitoring circuit may not manage the charge and discharge of battery cells. The first battery monitoring circuit can include first electronic measurement components and the second battery monitoring circuit can include second, distinct electronic measurement components. The first electronic measurement components can measure the temperature of battery cells, and the second electronic measurement components can measure the temperature of the same battery cells. The first electronic measurement components can detect an undervoltage or overvoltage condition of battery cells, and second electronic measurement components can detect an undervoltage or overvoltage condition of the same battery cells. The first battery monitoring circuit and the second battery monitoring circuit can share a common set of electronic measurement components for measuring the state of the battery cells. The second battery monitoring circuit can include: multiple identical BMS, each BMS controlling and monitoring one battery cell in the battery pack; and multiple master circuits, each master circuit controlling multiple BMS and collecting parameters monitored by the multiple BMS circuits. Each master circuit can include a CAN bus driver circuit. The second battery monitoring circuit can include multiple parameter sensors, each sensor generating one or a plurality of digital binary parameters depending on the state of one battery cell. The battery monitoring system can further include multiple combinational logic components for combining multiple binary parameters related to one battery cell. The battery monitoring system can further include multiple combinational logic components for combining multiple binary parameters related to multiple battery cells and generating the at least one second warning signal if one of the battery cells is defect. The battery monitoring system can further include multiple printed circuit board (PCB) cards, and one master circuit and one combinational logic component can be mounted on each of the PCB cards. The second battery monitoring circuit can be built so that any defective electronic measurement component triggers a second warning signal.

An electrical powering system is disclosed that can be used in an electric aircraft for powering a driving thrust-generating propeller or a lift-generating rotor. The electrical powering system can include: at least one motor; a first battery pack including high energy-density, low power battery cells; a second battery pack including low energy-density, high power battery cells; a circuit including a controller for powering said at least one motor from at least one of said battery packs and for generating motor driving signals for driving said at least one motor; wherein the electrical powering system is configured to charge said second battery pack from said first battery pack.

The electrical powering system of the preceding paragraph can include one or more of the following features: The can charge said second battery pack from said first battery pack. The controller or the circuit can transmit power from the first battery pack to the at least one motor at first instants and to the second battery pack and optionally to the motor at second instants. The controller or the circuit can include a selector for selecting a powering of the at least one motor: from the first battery pack only; from the second battery pack only; or simultaneously from the first and from the second battery pack. The circuit can include a DC-DC converter for converting current from the first battery-pack into current for charging the second battery pack. The electrical powering system can further include: a first said motor and a second said motor; a first controller circuit for generating motor driving signals for driving the first said motor; a second controller circuit for generating motor driving signals for driving the second said motor. The electrical powering system can further include a switching module connected to said first battery pack, to said second battery pack, to said first controller, and to said second controller, for commuting current from the first battery pack either, at different instants, to the second battery pack, to the first controller, or to the second controller. The switching module can commute current from the second battery pack either at different instants to the first controller or to the second controller. At least one of said motors acting as a generator for charging one of said battery packs. The electrical powering system can further include a commutator for determining which of said first battery pack and said second battery pack is charged by said generator. Said first battery pack and said second battery pack can include Li-Ion or Li—Po battery cells. The electrical powering system can further include a supercapacitor for powering said at least one motor, wherein said circuit is able to power said at least one motor from at least one of said first battery pack and said second battery pack or from said supercapacitor, and to charge said second battery pack from said first battery pack or from said supercapacitor. At least one of said at least one motor is able to work as a generator, said circuit being arranged for charging one of said first battery pack and said second battery pack from said generator when said generator is generating current. The electrical powering system can further include one motor arranged to work at least during some instants as a motor powered by one battery pack and as a generator for charging another battery pack or supercapacitor. The electrical powering system can further two said motors on a single axis so that at least during some instants one of the motors is functioning as a motor powered from one battery pack while the other motor is functioning as a generator for charging another battery pack. Aircraft can include the electrical powering system.

An electrical powering system is disclosed that can be used in an electric aircraft for powering a driving thrust-generating propeller or a lift-generating rotor. The electrical powering system can include: at least one motor; a first battery pack including high energy-density, low power battery cells; a second battery pack including low energy-density, high power battery cells; and a circuit including a controller for powering said at least one motor from at least one of said battery packs and for generating motor driving signals for driving said at least one motor. The electrical power system is configured to charge said first battery pack or said second battery pack from at least one of the at least one motor operating as generator.

The electrical powering system of the preceding paragraph can include one or more of the following features: The electrical powering system can charge said second battery pack from at least one of the at least one motor operating as generator. The controller can include: a first controller for powering said at least one motor from the first battery pack and for generating motor driving signals for driving said at least one motor; and a second controller for charging the second battery pack from the generator signals generated by the one motor operating as generator. The second controller can power said at least one motor from the second battery pack and for generating motor driving signals for driving said at least one motor. The at least one motor can include an electrical motor with a rotor, a first set of windings connected to the first controller for driving the rotor of the electrical motor based on the signals from the first controller, and a second set of windings connected to the second controller for generating generator signals from the rotor of the electrical motor to charge the second battery pack. The at least one motor can include a first motor connected to the first controller for driving the first motor based on the signals from the first controller and a second motor connected to the second controller for generating generator signals from the second motor of the electrical motor to charge the second battery pack. The first motor and the second motor can be mechanically coupled. The electrical powering system can concurrently drive the at least one motor based on the first battery pack and charge the second battery pack from the motor operated as generator. The electrical powering system can further include a supercapacitor, and the electrical powering system can charge the supercapacitor from the motor operated as generator. The circuit can drive the at least one motor in different drive modes, and the different drive modes can include a first drive mode in which the at least one motor is driven from the energy of the first battery pack. The different drive modes can include at least one of the following: a drive mode in which the at least one motor is driven from the power of the first battery pack and of the second battery pack, a drive mode in which the at least one motor is driven from the power of the second battery pack, a drive mode in which the at least one motor is driven from the power of the first battery pack and in which the second battery pack is charged by the power generated from the motor operated as generator, a drive mode in which the at least one motor is driven from the power of the first battery pack and in which the second battery pack is charged by the power generated from the motor operated as generator, a drive mode in which the first battery pack is charged by the power generated from the motor operated as generator, a drive mode in which the second battery pack is charged by the power generated from the motor operated as generator, a drive mode in which the first battery pack and the second battery pack is charged by the power generated from the motor operated as generator. The electrical powering system can further include a supercapacitor, and the different drive modes can include at least one of the following: a drive mode in which the at least one motor is driven from the power of the supercapacitor, a drive mode in which the at least one motor is driven from the power of the supercapacitor and of the first or second battery pack, a drive mode in which the at least one motor is driven from the power of the first battery pack or second battery pack and in which the super capacitor is charged by the power generated from the motor operated as generator, a drive mode in which the supercapacitor is charged by the power generated from the motor operated as generator, a drive mode in which the supercapacitor and the first battery pack or the second battery pack is charged by the power generated from the motor operated as generator. The second battery pack can be charged from the power of the first battery pack. An aircraft can include the electrical powering system. The motor operating as generator can be driven by braking energy of the aircraft.

Additional Features and Terminology

Although examples provided herein may be described in the context of an aircraft, such as an electric or hybrid aircraft, one or more features may further apply to other types of vehicles usable to transport passengers or goods. For example, the one or more futures can be used to enhance construction or operation of automobiles, trucks, boats, submarines, spacecrafts, hovercrafts, or the like.

As used herein, the term "programmable component," in addition to having its ordinary meaning, can refer to a component that may process executable instructions to perform operations or may be configured after manufacturing to perform different operations responsive to processing the same inputs to the component. As used herein, the term "non-programmable component," in addition to having its ordinary meaning, can refer to a component that may not process executable instructions to perform operations and may not be configured after manufacturing to perform different operations responsive to processing the same inputs to the component.

As used herein, the term "stateful component," in addition to having its ordinary meaning, can refer to a component that may remember a preceding state or event prior to a current state or event. A stateful component thus may determine an output from an event history as opposed to just from a current condition. As used herein, the term "non-stateful component," in addition to having its ordinary meaning, can refer to a component that may not remember a preceding state or event prior to a current state or event. A non-stateful component thus may not determine an output from an event history but may determine an output from a current condition.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for instance, through multi-threaded processing, interrupt processing, or multiple processors or processor cores or on other parallel architectures, rather than sequentially. In addition, different tasks or processes can be performed by different machines or computing systems that can function together.

Unless otherwise specified, the various illustrative logical blocks, modules, and algorithm steps described herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Unless otherwise specified, the various illustrative logical blocks and modules described in connection with the embodiments disclosed herein can be implemented or performed by a machine, a microprocessor, a state machine, a digital signal processor (DSP), an application specific integrated circuit (ASIC), a FPGA, or other programmable logic device, discrete gate or transistor logic, discrete hardware components, or any combination thereof designed to perform the functions described herein. A hardware processor can include electrical circuitry or digital logic circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a device controller, or a computational engine within an appliance, to name a few.

Unless otherwise specified, the steps of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements or states. Thus, such conditional language is not generally intended to imply that features, elements or states are in any way required for one or more embodiments or that one or more embodiments necessarily include logic for deciding, with or without author input or prompting, whether these features, elements or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

What is claimed is:

1. An aircraft comprising a power management system with power sources that have different power densities from one another and are usable for powering a transducer, the aircraft comprising:
    a transducer supported by a housing and configured to cause the housing to fly;
    a first power source configured to power the transducer;
    a second power source configured to power the transducer, the second power source having a higher power density than the first power source; and
    electronic circuitry configured to control, based at least on whether the housing is taking off, whether one or both of the first power source or the second power source powers the transducer,
    wherein the transducer is simultaneously driven by the first power source and the second power source, and
    wherein the transducer is powered only by the first and second power sources and is not powered by a gas turbine engine.

2. The aircraft of claim 1, wherein the electronic circuitry is configured to control, based at least on whether the housing is taking off, whether one or both of the first power source or the second power source powers the transducer so that, when the housing is taking off, the second power source powers the transducer and the first power source does not power the transducer.

3. The aircraft of claim 2, wherein the electronic circuitry is configured to control, based at least on whether the housing is operating in steady flight conditions, whether one or both of the first power source or the second power source powers the transducer so that, when the housing is operating in the steady flight conditions, the first power source powers the transducer and the second power source does not power the transducer.

4. The aircraft of claim 2, wherein the electronic circuitry is configured to control, based at least on whether the housing is landing, whether one or both of the first power source or the second power source powers the transducer so that, when the housing is landing, the first power source powers the transducer and the second power source does not power the transducer.

5. The aircraft of claim 1, wherein the electronic circuitry is configured to control, based at least on whether the housing is taking off, whether one or both of the first power source or the second power source powers the transducer so that, when the housing is taking off, the first power source and the second power source power the transducer.

6. The aircraft of claim 5, wherein the electronic circuitry is configured to control, based at least on whether the housing is operating in steady flight conditions, whether one or both of the first power source or the second power source powers the transducer so that, when the housing is operating in the steady flight conditions, the first power source powers the transducer and the second power source does not power the transducer.

7. The aircraft of claim 5, wherein the electronic circuitry is configured to control, based at least on whether the housing is landing, whether one or both of the first power source or the second power source powers the transducer so that, when the housing is landing, the first power source powers the transducer and the second power source does not power the transducer.

8. The aircraft of claim 1, wherein the electronic circuitry is configured to control, based at least on whether the housing is operating in steady flight conditions, whether one or both of the first power source or the second power source powers the transducer.

9. The aircraft of claim 1, wherein the electronic circuitry is configured to control, based at least on whether the housing is landing, whether one or both of the first power source or the second power source powers the transducer.

10. The aircraft of claim 1, wherein the transducer is configured to charge the first power source or the second power source, and the electronic circuitry is configured to control, based at least on whether the housing is landing, whether the first power source or the second power source is charged by the transducer.

11. The aircraft of claim 1, wherein the second power source is configured to charge the first power source, and the electronic circuitry is configured to control when the second power source charges the first power source.

12. The aircraft of claim 11, wherein the electronic circuitry is configured to cause the second power source to charge the first power source while the first power source is powering the transducer.

13. The aircraft of claim 11, wherein the electronic circuitry is configured to cause the second power source to charge the first power source while the first power source is not powering the transducer.

14. The aircraft of claim 1, wherein the first power source comprises a first set of batteries, and the second power source comprises a second set of batteries.

15. The aircraft of claim 1, wherein the second power source comprises a supercapacitor.

16. The aircraft of claim 1, wherein the electronic circuitry comprises a controller.

17. The aircraft of claim 1, further comprising another transducer on a common axis as and mechanically coupled to the transducer, the another transducer being configured to charge the first power source or the second power source while the transducer causes the housing to fly.

18. The aircraft of claim 1, wherein the electronic circuitry is configured to generate a drive signal to operate the transducer.

19. A method of operating a power management system of an aircraft, the method comprising:
- powering, by a first power source, a transducer supported by a housing;
- powering, by a second power source having a higher power density than the first power source, the transducer;
- causing, by the transducer, the housing to fly; and
- based at least on whether the housing is taking off, controlling, by electronic circuitry, whether one or both of the first power source or the second power source powers the transducer,
- wherein the transducer is simultaneously driven by the first power source and the second power source, and
- wherein the transducer is powered only by the first and second power sources and is not powered by a gas turbine engine.

20. The method of claim 19, wherein said controlling whether one or both of the first power source or the second power source powers the transducer comprises controlling, when the housing is taking off, the second power source to power the transducer and the first power source to not power the transducer.

21. The method of claim 19, further comprising, based at least on whether the housing is the housing is operating in steady flight conditions, controlling, by the electronic circuitry, whether one or both of the first power source or the second power source powers the transducer.

22. The method of claim 19, further comprising, based at least on whether the housing is landing, controlling, by the electronic circuitry, whether the first power source or the second power source is charged by the transducer.

23. The method of claim 19, wherein the first power source comprises a first set of batteries, and the second power source comprises a second set of batteries.

24. The method of claim 19, wherein the second power source comprises a supercapacitor.

* * * * *